United States Patent
Kim et al.

(10) Patent No.: US 10,050,540 B2
(45) Date of Patent: Aug. 14, 2018

(54) PROTECTION CIRCUIT AND METHOD FOR FLYBACK POWER CONVERTER

(71) Applicant: SEMICONDUCTOR COMPONENTS INDUSTRIES, LLC, Phoenix, AZ (US)

(72) Inventors: Eui-Soo Kim, New Taipei (TW); Jian-Ming Fu, Taichung (TW); Jui-Chien Wang, Taipei (TW); Chou-Sheng Wang, Keelung (TW); Ju-Hyun Kim, Siheung (TW); Tse-Jen Tseng, Taichung (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 275 days.

(21) Appl. No.: 15/175,382

(22) Filed: Jun. 7, 2016

(65) Prior Publication Data
US 2017/0353115 A1 Dec. 7, 2017

(51) Int. Cl.
| | |
|---|---|
| *H02H 3/00* | (2006.01) |
| *H02M 3/335* | (2006.01) |
| *H02M 1/36* | (2007.01) |
| *H02M 1/32* | (2007.01) |
| *H02M 1/08* | (2006.01) |
| *H02M 1/00* | (2006.01) |
| *H02H 9/02* | (2006.01) |
| *H02H 3/087* | (2006.01) |
| *H02J 7/00* | (2006.01) |
| *G06F 1/26* | (2006.01) |

(52) U.S. Cl.
CPC ......... *H02M 3/33523* (2013.01); *H02M 1/08* (2013.01); *H02M 1/32* (2013.01); *H02M 1/36* (2013.01); *G06F 1/26* (2013.01); *H02H 3/087* (2013.01); *H02H 9/02* (2013.01); *H02J 2007/0039* (2013.01); *H02M 2001/0009* (2013.01)

(58) Field of Classification Search
USPC .............................................. 361/18, 86–87
See application file for complete search history.

(56) References Cited

U.S. PATENT DOCUMENTS

| | | |
|---|---|---|
| 2014/0313792 A1 | 10/2014 | Nate et al. |
| 2015/0311806 A1 | 10/2015 | Kim et al. |
| 2015/0326008 A1* | 11/2015 | Baurle ................. H02H 1/0084 361/87 |

\* cited by examiner

*Primary Examiner* — Danny Nguyen
(74) *Attorney, Agent, or Firm* — Robert F. Hightower

(57) ABSTRACT

A protection circuit for a power converter is provided. The protection circuit includes a sensor circuit, a detection circuit and an initial protection circuit. The sensor circuit senses an output current of the power converter to generate a load signal. The detection circuit detects a voltage signal at a signal terminal of the connection port. The initial protection circuit compares the load signal with an initial-protection threshold. When the voltage signal at the signal terminal switches to a high level from a low level after the protection circuit is enabled, the power converter enters an initial protection mode and the initial protection circuit counts an initial period of a port-identification procedure. When the load signal is larger than the initial-protection threshold during the initial period of the port-identification procedure, the initial protection circuit generates a first protection signal to shut down the power converter.

37 Claims, 15 Drawing Sheets

PROTECTION CIRCUIT AND METHOD FOR FLYBACK POWER CONVERTER

BACKGROUND OF THE INVENTION

Field of the Invention

The disclosure relates generally to a protection circuit and more particularly it relates to a protection circuit of a flyback power converter.

Description of the Related Art

Portable devices nowadays, such as smart phones and tablets, become more popular than ever. Those devices are usually powered (charged) by travel adapters. However, a conductive pollution presented between a power terminal and a ground terminal of tiny connection ports of the travel adaptor/portable devices or a connection cable that connects both may cause a short-circuited issue. A considerable short-circuit current induced by the pollution could damage the tiny connection ports, the connection cable or even the powered device itself. A protection circuit and method to solve the above issue will be desired by the industry.

BRIEF SUMMARY OF THE INVENTION

Thus, the present invention provides a protection circuit which is capable of detecting whether any protection event occurs for protecting a cable or a powered device from being damaged by a large current.

An embodiment of a protection circuit for a power converter is provided. The power converter has a connection port coupled to an output of the power converter. The protection circuit comprises a sensor circuit, a detection circuit, an initial protection circuit. The sensor circuit is coupled to the connection port. The sensor circuit senses an output current of the power converter to generate a load signal. The detection circuit is coupled to the connection port. The detection circuit detects a voltage signal at a signal terminal of the connection port. The initial protection circuit is coupled to the sensor circuit. The initial protection circuit receives the load signal and compares the load signal with an initial-protection threshold. When the voltage signal at the signal terminal switches to a high level from a low level after the protection circuit is enabled, the power converter enters an initial protection mode and the initial protection circuit counts an initial period of a port-identification procedure. When the load signal is larger than the initial-protection threshold during the initial period of the port-identification procedure, the initial protection circuit will generate a first protection signal to shut down the power converter. The high level is a level higher than an attachment threshold and the low level is a level lower than the attachment threshold.

Another embodiment of a protection circuit for a power converter is provided. The power converter has a connection port coupled to an output of the power converter. The protection circuit comprises a sensor circuit, a detection circuit, a detachment-confirmation circuit, and a detachment-protection circuit. The sensor circuit is coupled to the connection port. The sensor circuit senses an output current of the power converter to generate a load signal. The detection circuit is coupled to the connection port. The detection circuit detects a voltage signal at a signal terminal of the connection port. The detachment-confirmation circuit is coupled to the sensor circuit and the detection circuit. The detachment-confirmation circuit generates a detachment-confirmation signal according to the load signal and the voltage signal at the signal terminal. The detachment-protection circuit is coupled to the detachment-confirmation circuit. The detachment-protection circuit receives the detachment-confirmation signal and the load signal and compares the load signal with a detachment-protection threshold. After the protection circuit is enabled, when the voltage signal at the signal terminal switches to a high level from a low level, the power converter starts a port-identification procedure. When the voltage signal at the signal terminal becomes less than an attachment threshold and the load signal is less than a detachment threshold, the detachment-confirmation circuit enables the detachment-confirmation signal. When the detachment-confirmation signal is enabled and the load signal is larger than the detachment-protection threshold, the detachment protection circuit generates a first protection signal to shut down the power converter. The high level is a level higher than the attachment threshold and the low level is a level lower than the attachment threshold.

An embodiment of a protection circuit for a power converter is provided. The power converter has a connection port coupled to an output of the power converter. The protection circuit comprises steps of determining whether a positive edge occurs at a voltage signal at a signal terminal of the connection port; when the positive edge occurs at the voltage signal at the signal terminal, entering an initial protection mode and determining whether a load signal is larger than an initial-protection threshold during an initial period of a port-identification procedure, wherein the load signal is related to an output current of the power converter; and when the load signal is larger than the initial-protection threshold during the initial period of the port-identification procedure, shutting down the power converter.

An embodiment of a protection circuit for a power converter is provided. The power converter has a connection port coupled to an output of the power converter. The protection circuit comprises steps of determining whether a positive edge occurs at a voltage signal at a signal terminal of the connection port; when the positive edge occurs at the voltage signal at the signal terminal, entering a port-identification procedure and determining whether the voltage signal at the signal terminal is larger than an attachment threshold; during the port-identification procedure, when the voltage signal at the signal terminal is not larger than the attachment threshold, determining whether the load signal is less than a detachment threshold; and during the port-identification procedure, when the load signal is less than the detachment threshold, determining whether a load signal is larger than a detachment-protection threshold, wherein the load signal is related to an output current of the power converter; and when the load signal is larger than the detachment-protection threshold during the port-identification procedure, shutting down the power converter.

A detailed description is given in the following embodiments with reference to the accompanying drawings.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
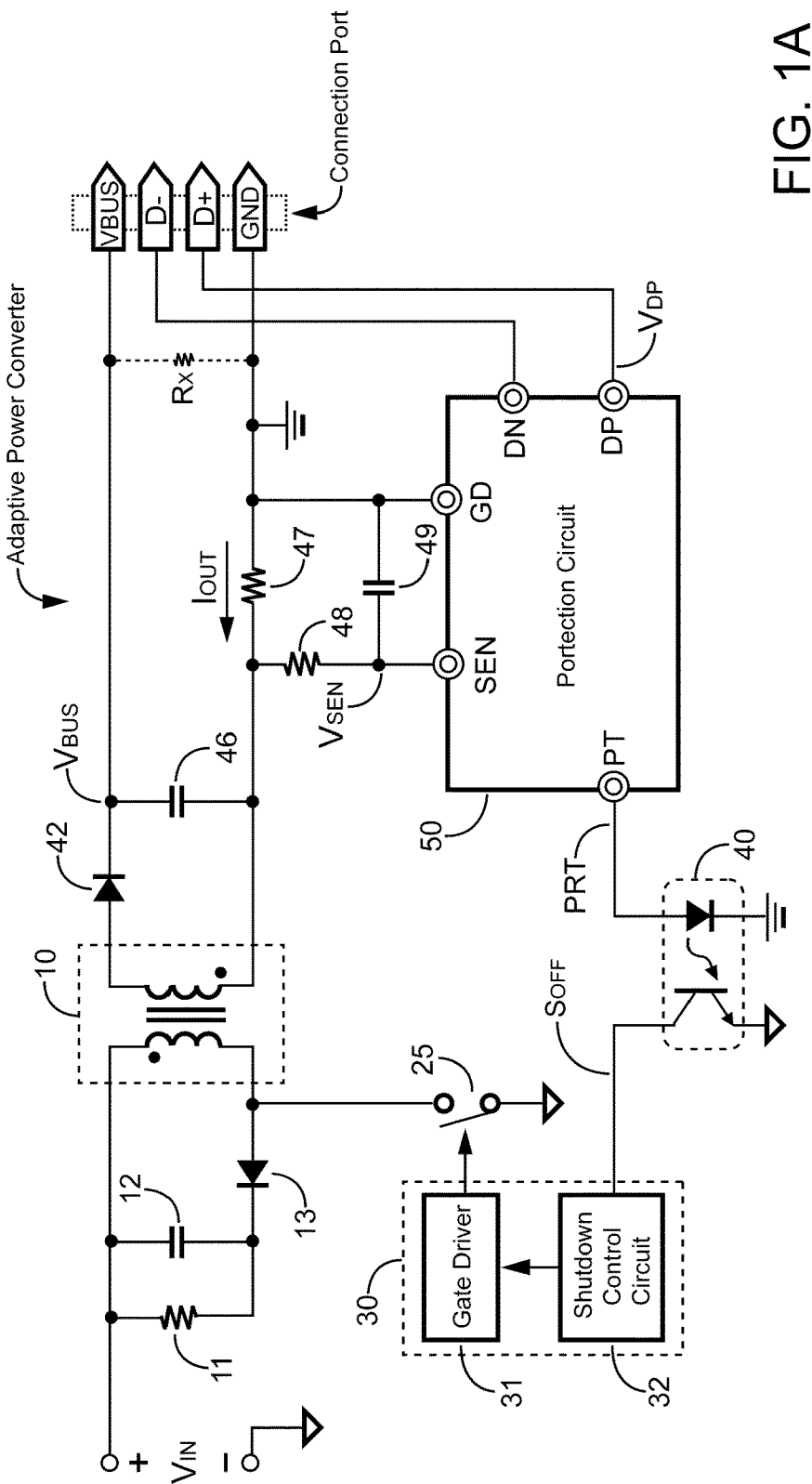
FIG. 1A is a circuit diagram of an embodiment of an adaptive flyback power converter.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and doesn't in itself dictate a relationship between the various embodiments and/or configurations discussed.

FIG. 1A shows an exemplary embodiment of an adaptive flyback power converter. As shown in FIG. 1A, an adaptive flyback power converter comprises a transformer 10, resistors 11, 47 and 48, capacitors 12, 46 and 49, rectifiers (diodes) 13 and 42, a power switch 25, a pulse width modulation (PWM) controller 30, an optical coupler 40 and a protection circuit 50. The PWM controller 30 comprises a gate driver 31 and a shutdown control circuit 32. The transformer 10 receives an input voltage $V_{IN}$ of the power converter and generates an output current $I_{OUT}$ and an output voltage $V_{BUS}$ via the rectifier 42 and the capacitor 46. The power switch 25 coupled to the transformer 10 is controlled by the PWM controller 30 to switch the transformer 10 for generating the output voltage $V_{BUS}$. The power converter comprises a connection port having four terminals: a power terminal VBUS, a ground terminal GND, a positive signal terminal D+ and a negative signal terminal D−. The power converter generates the output voltage $V_{BUS}$ across the power terminal VBUS and the ground terminal GND. In the embodiment, the connection port is an USB (Universal Serial Bus) port.

A sensed voltage $V_{SEN}$ is generated according to the output current $I_{OUT}$ through a filter composed of the resistor 48 and the capacitor 49. The protection circuit 50 receives the output current $I_{OUT}$ through terminals SEN and GD. Terminals DP and DN of the protection circuit 50 respectively connect with a positive signal terminal D+ and a negative signal terminal D− of the connector port. The protection circuit 50 detects a voltage signal $V_{DP}$ at the positive signal terminal D+ through the terminal DP. The protection circuit 50 generates a protection-activation signal PRT to indicate the occurrence of a protection event. The optical coupler 40 receives the protection-activation signal PRT and generates an off signal $S_{OFF}$ in response thereto. The shutdown control circuit 32 receives the off signal $S_{OFF}$ and controls the gate driver 31 to turn on or off the power switch 25 in response to the off signal $S_{OFF}$. When the shutdown control circuit 32 becomes aware of the occurrence of the protection event according to the off signal $S_{OFF}$, it will control the gate driver 31 to turn off the power switch 25. Therefore, the power converter will be shut down and stop generating the output voltage $V_{BUS}$ any more. In one case, the protection event is an event that there is a conductive path between the power terminal VBUS and the ground terminal GND of the connection port of the power converter due to a conductive element denoted by a resistor $R_X$. That is, the protection event is an event that the connection port of the power converter is polluted by a conductive element, such as water or dust.

Figure 1B:
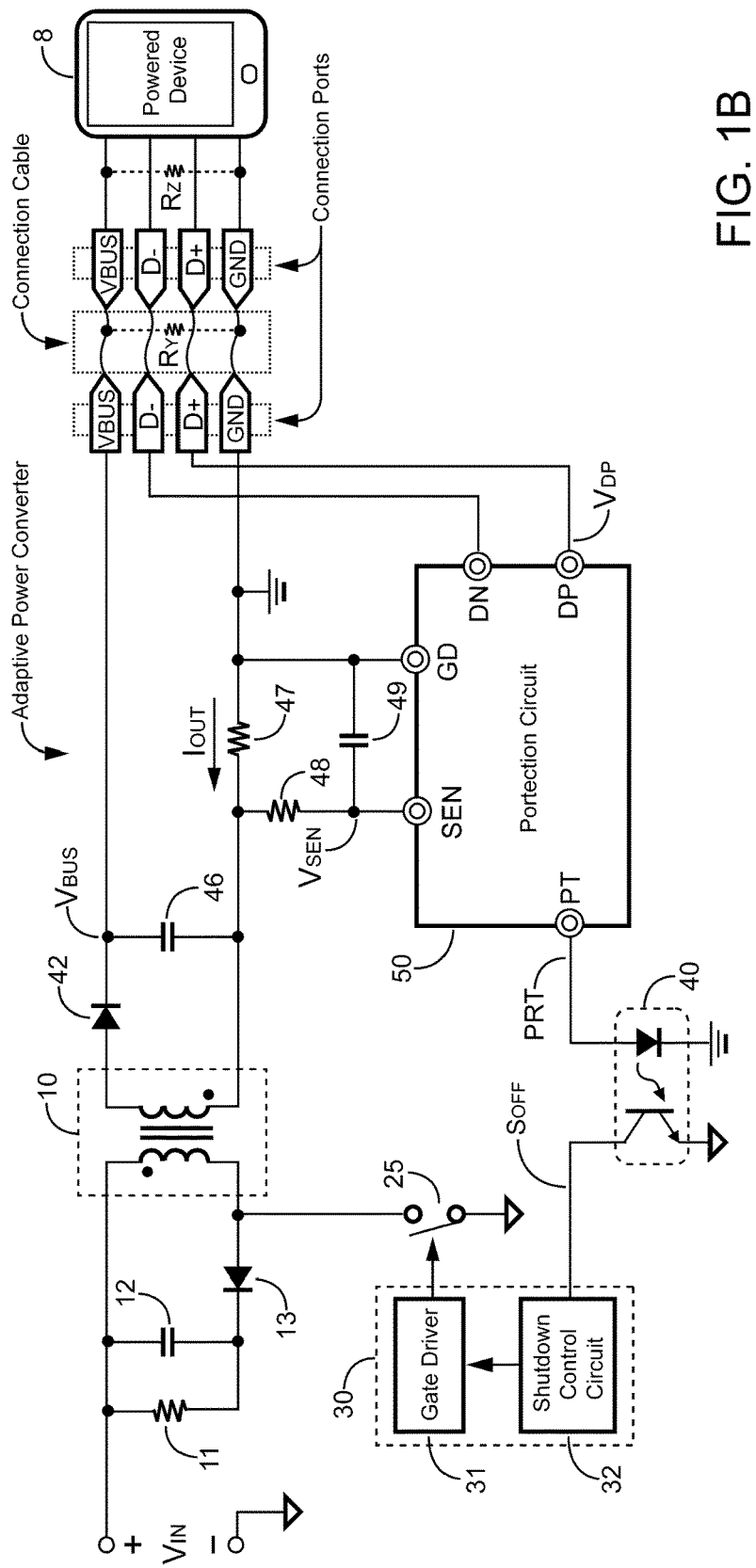
FIG. 1B is a circuit diagram of an embodiment of an adaptive flyback power converter connected with a powered device through a connection cable.

In another embodiment, as shown in FIG. 1B, a powered device (PD) 8, such as a smart phone, may be attached to the power converter through a connection cable, for example, an USB cable. The powered device 8 can be charged by the output voltage $V_{BUS}$ provided from the power converter. In the embodiment of FIG. 1B, the protection event is an event that there is a conductive path between the power terminal VBUS and the ground terminal GND of the connection port of the power converter due to a conductive element denoted by a resistor $R_Y$ on the USB cable or due to a conductive element denoted by a resistor $R_Z$ on the connection port of the powered device. Whenever any of the conductive elements $R_X$, $R_Y$ and $R_Z$ is present, the pollution of the connection port/cable is confirmed and the protection event occurs.

Figure 2:
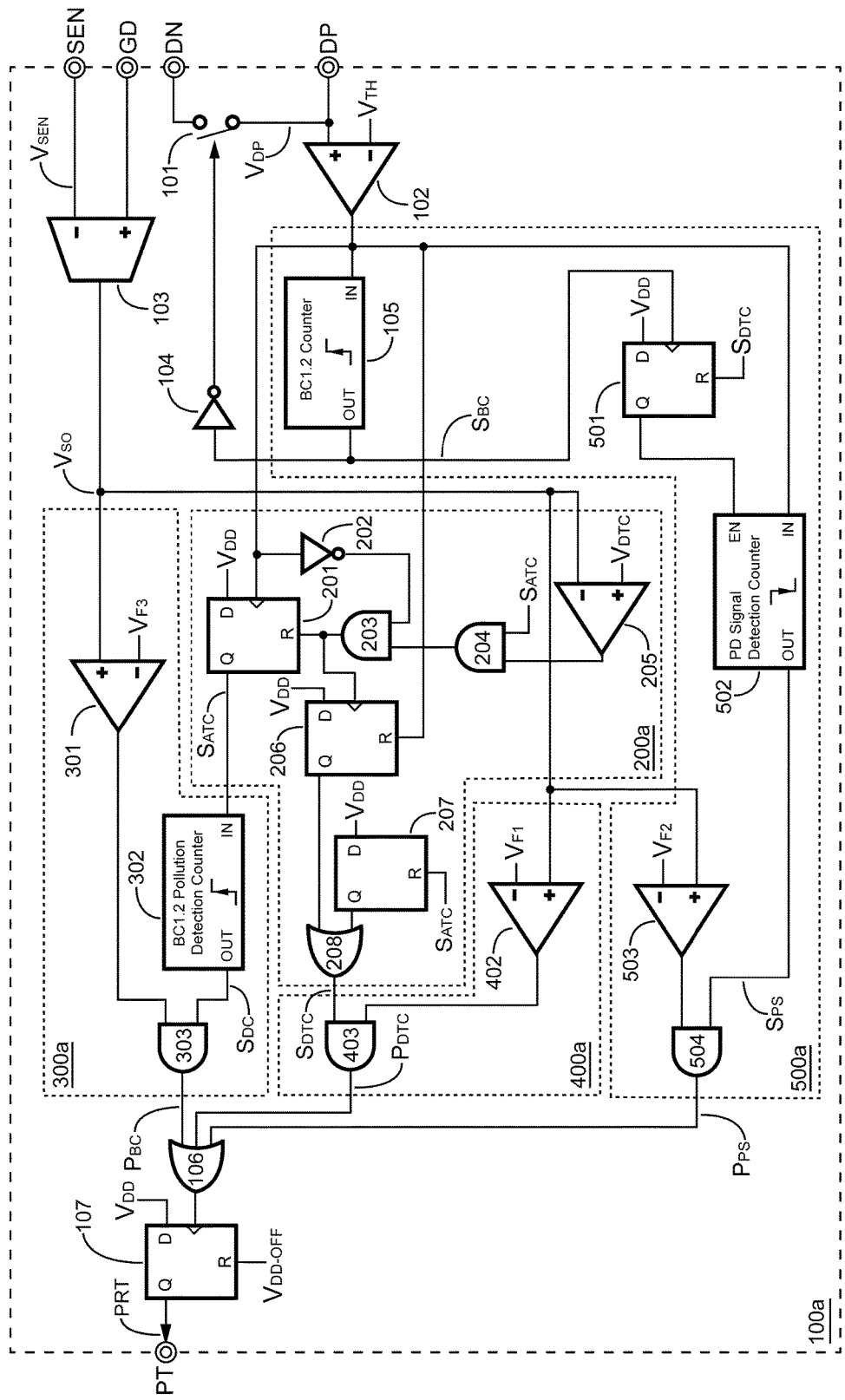
FIG. 2 shows an exemplary embodiment of a protection circuit of the adaptive flyback power converter.

FIG. 2 shows an exemplary embodiment of the protection circuit 50. As shown in FIG. 2, the protection circuit 100a is an embodiment of the protection circuit 50. The protection circuit 100a comprises a switch 101, a detection circuit 102, a sensor circuit 103, an inverter 104, an OR gate 106, a D flip-flop 107, a detachment-confirmation circuit 200a, an initial protection circuit 300a, a detachment-protection circuit 400a and a device-protection circuit 500a. The switch 101 is coupled between the terminals DP and DN and controlled by the inverter 104. In the embodiment, the detection circuit 102 is implemented by a comparator for detecting the voltage signal $V_{DP}$ at the positive signal terminal D+ of the connection port. The positive input terminal (+) of the comparator 102 is coupled to the terminal DP to receive the voltage signal $V_{DP}$ and the negative input terminal (−) thereof receives an attachment threshold $V_{TH}$. The sensor circuit 103 is coupled to the terminals SEN and GD to receive the sensed voltage $V_{SEN}$ and generates a load signal $V_{SO}$ according to the sensed voltage $V_{SEN}$ derived from the output current $I_{OUT}$. The load signal $V_{SO}$ is related to the output current $I_{OUT}$. Thus, the sensor circuit 103 is coupled to sense the output current $I_{OUT}$ for generating the load signal $V_{SO}$.

The detachment-confirmation circuit 200a comprises an inverter 202 and AND gates 203 and 204, a comparator 205, D flip-flops 201 and 206, a latch 207 and an OR gate 208. The input terminal (D) of the D flip-flop 201 receives a supply voltage $V_{DD}$ with a high level and the clock terminal thereof is coupled to the output terminal of the comparator 102. The D flip-flop 201 generates an attachment-confirmation signal $S_{ATC}$ at its output terminal (Q). The input terminal of the inverter 202 is coupled to the output terminal of the comparator 102. The positive input terminal (+) of the comparator 205 receives a detachment threshold $V_{DTC}$ and the negative input terminal (−) thereof receives the load signal $V_{SO}$. An input terminal of the AND gate 204 is coupled to the output terminal of the comparator 205 and the other input terminal thereof receives the attachment-confirmation signal $S_{ATC}$. An input terminal of the AND gate 203 is coupled to the output terminal of the AND gate 204 and the other input terminal thereof is coupled to the output terminal of the inverter 202. The output terminal of the AND gate 203 is coupled to the reset terminal (R) of the D flip-flop 201 and the clock terminal of the D flip-flop 206. The input terminal (D) of the D flip-flop 206 receives the supply voltage $V_{DD}$ with a high level and the reset terminal (R) thereof is coupled to the output terminal of the comparator 102. The input terminal (D) of the latch 207 receives the supply voltage $V_{DD}$ with a high level and the reset terminal (R) thereof receives the attachment-confirmation signal $S_{ATC}$. An input terminal of the OR gate 208 is coupled to the output terminal (Q) of the D flip-flop 206 and the other input terminal thereof is coupled to the output terminal (Q) of the latch 207. The OR gate 208 generates a detachment-confirmation signal $S_{DTC}$ at its output terminal.

The initial protection circuit 300a comprises a comparator 301, a BC1.2 pollution detection counter 302 and an AND gate 303. The positive input terminal (+) of the comparator 301 receives the load signal $V_{SO}$ and the negative input terminal (−) thereof receives an initial-protection threshold $V_{F3}$. An input terminal of the BC1.2 pollution detection counter 302 receives the attachment-confirmation signal $S_{ATC}$. The BC1.2 pollution detection counter 302 generates a BC1.2 delay signal $S_{DC}$ at its output terminal. An input terminal of the AND gate 303 is coupled to the output terminal of the comparator 301 and the other input terminal thereof receives the BC1.2 delay signal $S_{DC}$. The AND gate 303 generates a protection signal $P_{BC}$ at its output terminal.

The detachment-protection circuit 400a comprises a comparator 402 and an AND gate 403. The positive input terminal (+) of the comparator 402 receives the load signal $V_{SO}$ and the negative input terminal (−) thereof receives a detachment-protection threshold $V_{F1}$. An input terminal of the AND gate 403 is coupled to the output terminal of the comparator 402 and the other input terminal thereof receives the detachment-confirmation signal $S_{DTC}$. The AND gate 403 generates a protection signal $P_{DTC}$ at its output terminal.

The device-protection circuit 500a comprises a BC1.2 counter 105, a D flip-flop 501, a PD signal detection counter 502, a comparator 503 and an AND gate 504. The input terminal of the BC1.2 counter 105 is coupled to the output terminal of the comparator 102. The BC1.2 counter 105 generates a BC1.2 ready signal $S_{BC}$ at its output terminal. The input terminal (D) of the D flip-flop 501 receives the supply voltage $V_{DD}$ with a high level, the clock terminal thereof receives the BC1.2 ready signal $S_{BC}$ and the reset terminal (R) thereof is supplied with the detachment-confirmation signal $S_{DTC}$. The enable terminal (EN) of the PD signal detection counter 502 is coupled to the output terminal (Q) of the D flip-flop 501 and the input terminal thereof is coupled to the output terminal of the comparator 102. The PD signal detection counter 502 generates a PD ready signal $S_{PS}$ at its output terminal. The positive input terminal (+) of the comparator 503 receives the load signal $V_{SO}$ and the negative input terminal (−) thereof receives a device-protection threshold $V_{F2}$. An input terminal of the AND gate 504 is coupled to the output terminal of the comparator 503 and the other input terminal thereof receives the PD ready signal $S_{PS}$. The AND gate 504 generates a protection signal $P_{PS}$ at its output terminal.

The OR gate 106 receives the protection signals $P_{BC}$, $P_{DTC}$ and $P_{PS}$. The input terminal (D) of the D flip-flop 107 receives the supply voltage $V_{DD}$ with a high level, the clock terminal thereof is coupled to the output terminal of the OR gate 106 and the reset terminal (R) thereof receives a signal $V_{DD\text{-}OFF}$. The D flip-flop 107 generates the protection-activation signal PRT at its output terminal (Q). Whenever any of the protection signals $P_{BC}$, $P_{DTC}$ and $P_{PS}$ is enabled, the protection-activation signal PRT will be enabled accordingly to indicate that a protection event occurs. The signal $V_{DD\text{-}OFF}$ will be enabled (high level) to disable the protection-activation signal PRT via the flip-flop 107 as the protection circuit 100a is turned off.

Figure 2A:
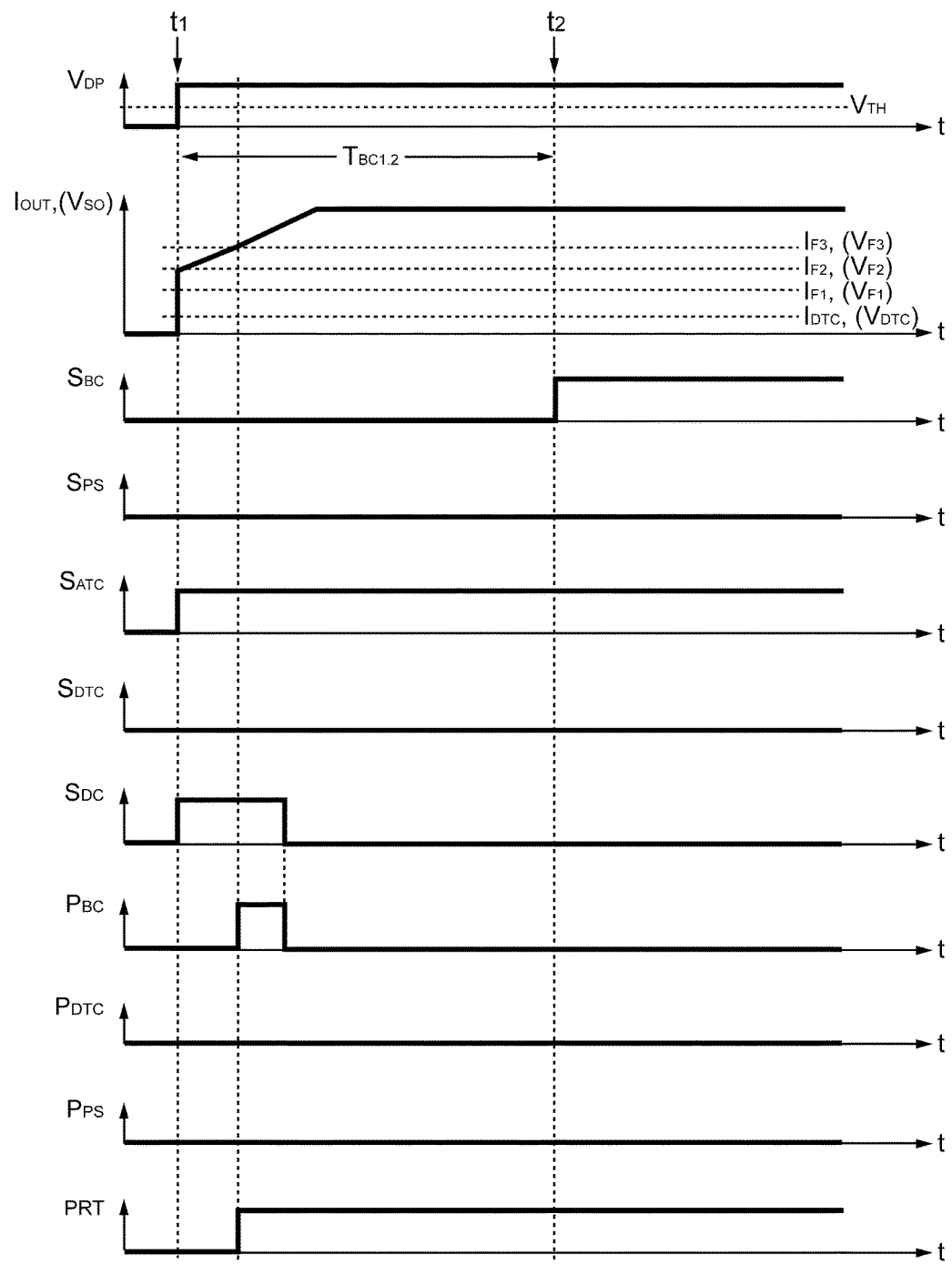
FIG. 2A shows key signal waveforms of the protection circuit in FIG. 2 when the connection port/cable pollution occurs during an initial period of a BC1.2 procedure.
Figure 2B:
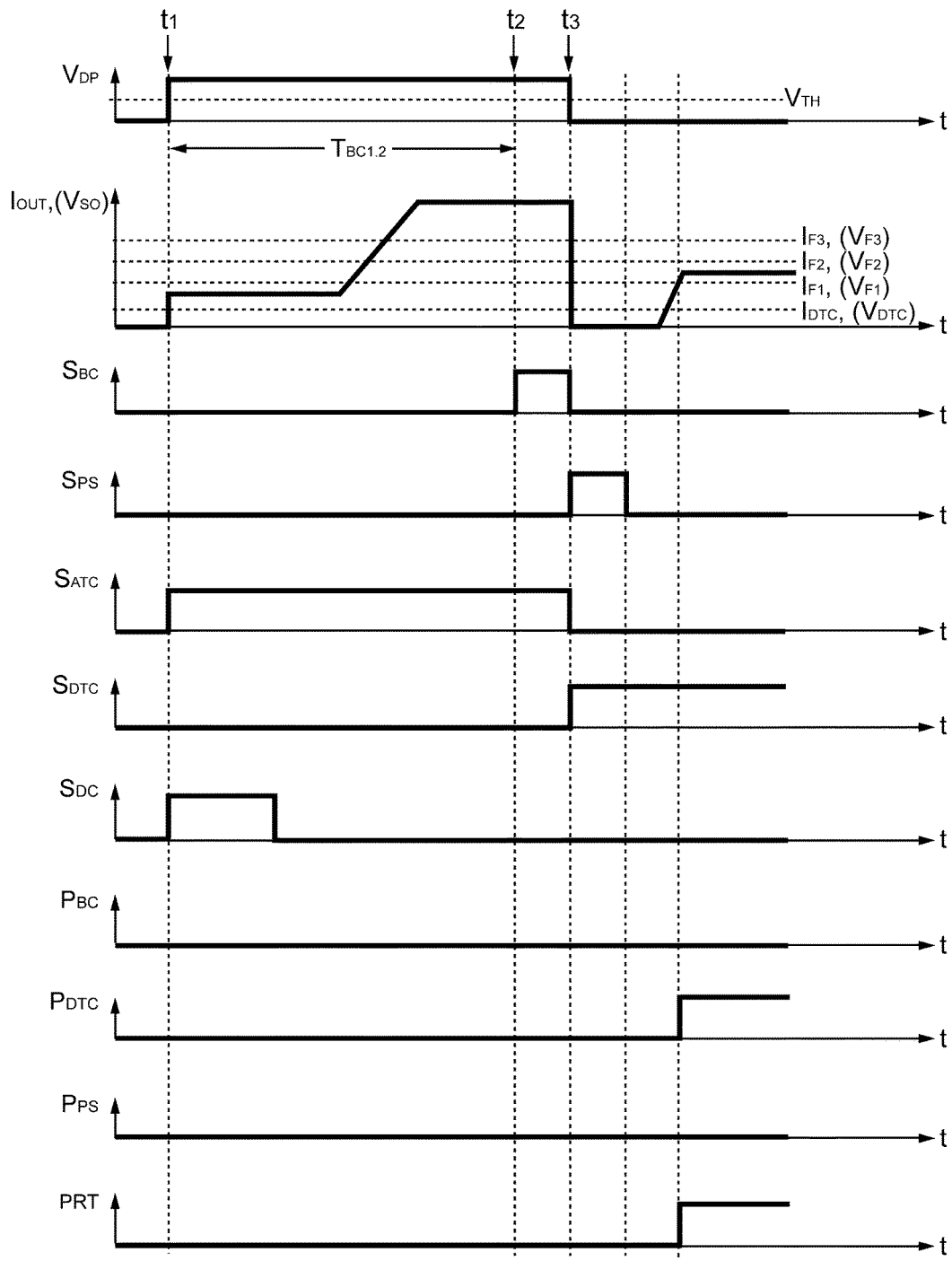
FIG. 2B shows key signal waveforms of the protection circuit in FIG. 2 when the connection port/cable pollution occurs after the powered device is detached from the power converter.
Figure 2C:
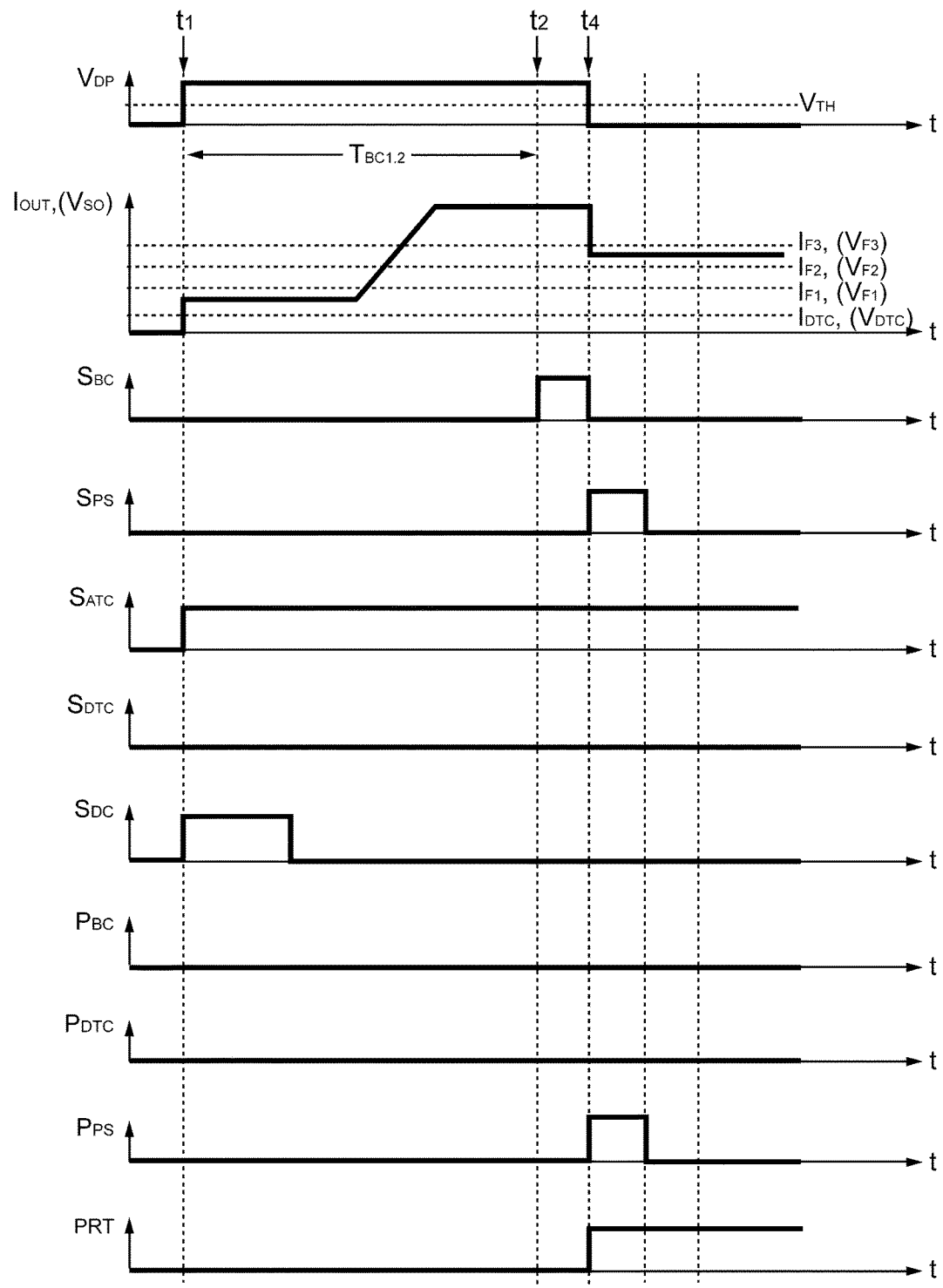
FIG. 2C shows key signal waveforms of the protection circuit in FIG. 2 when the connection port/cable pollution occurs while the powered device is requesting the power converter to perform pollution detection.
Figure 2D:
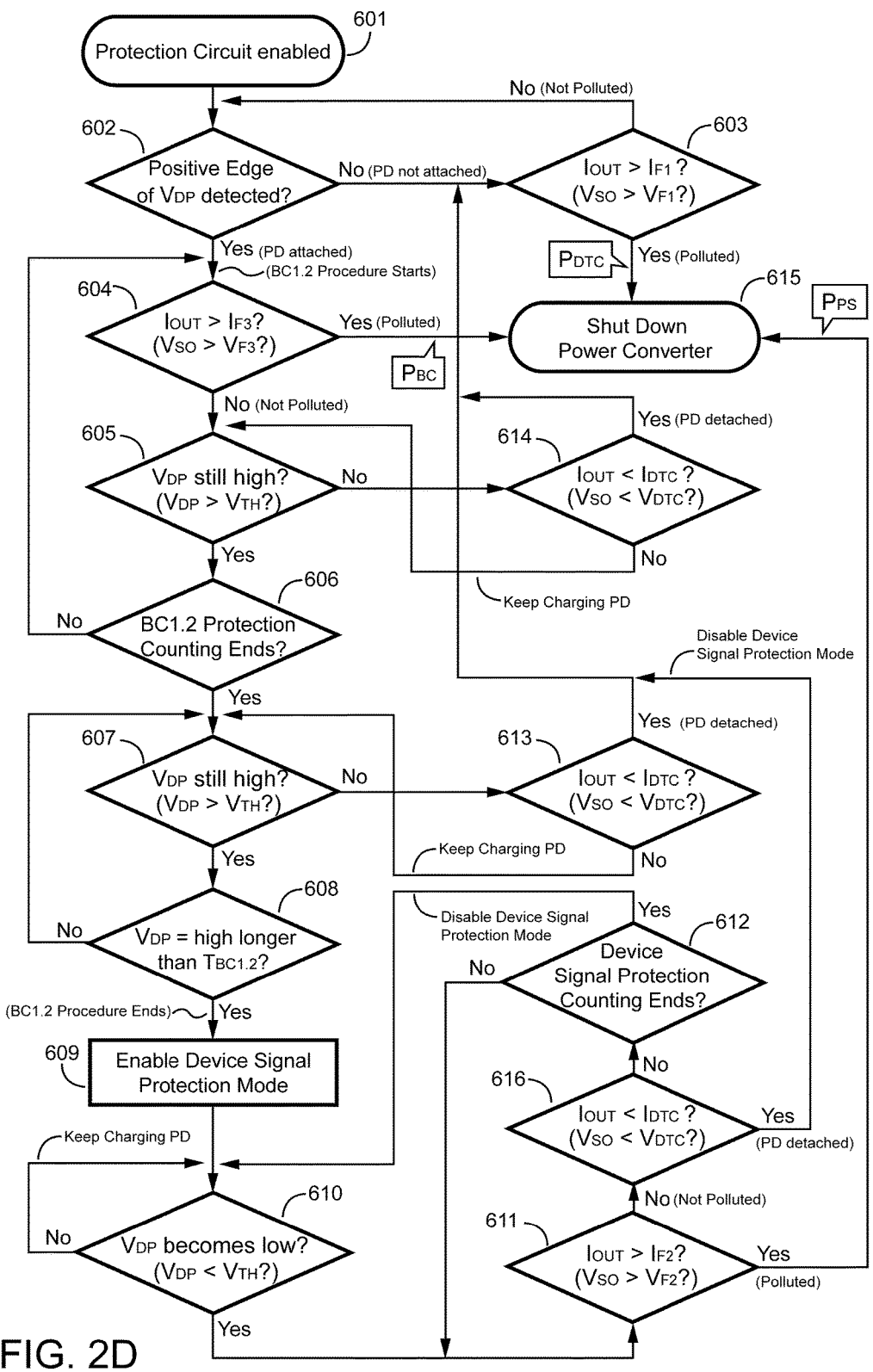
FIG. 2D is a flowchart of an exemplary embodiment of a protection method for the protection circuit in FIG. 2.

The operations of the protection circuit 100a will be described by referring to FIGS. 2A-2D. FIGS. 2A-2C show waveforms of key signals of the protection circuit 100a in different scenarios of protection event. FIG. 2D is a flowchart of an exemplary embodiment of a protection method for the protection circuit 100a. Both referring to FIGS. 2 and 2D, the protection circuit 100a starts its protection operation when the protection circuit 100a is enabled (step 601). After the protection circuit 100a is just enabled, the BC1.2 ready signal $S_{BC}$ is initially disabled to turn on the switch 101 via the inverter 104. Next, the comparator 102 will detects the occurrence of the positive edge of the voltage signal $V_{DP}$ (step 602). The occurrence of the positive edge of the voltage signal $V_{DP}$ means that the voltage signal $V_{DP}$ switches from a low level to a high level. The low level is a level lower than the attachment threshold $V_{TH}$ and the high level is a level higher than the attachment threshold $V_{TH}$. In the case that the positive edge of the voltage signal $V_{DP}$ is not detected, it means that the powered device (PD) is not attached to the power converter yet. The detachment-confirmation signal $S_{DTC}$ will become high in response thereto. In the meantime, the protection method flow will go to step 603 where the comparator 402 compares the load signal $V_{SO}$ with the detachment-protection threshold $V_{F1}$ to determine whether the load signal $V_{SO}$ is larger than the detachment-protection threshold $V_{F1}$. Once the load signal $V_{SO}$ is larger than the detachment-protection threshold $V_{F1}$, it means that the connection port is polluted by a conductive element and the comparator 402 will enable its output signal at its output terminal. Accordingly, the AND gate 403 will enable the protection signal $P_{DTC}$ in response to the enabled detachment-confirmation signal $S_{DTC}$ and the enabled output signal of the comparator 402. Thus, the OR gate 106 enables its output signal in response to the enabled protection signal $P_{DTC}$. Thus, the D flip-flop 107 enables the protection-activation signal PRT and the gate driver 31 turns off the power switch 25 to shut down the power converter (step 615). On the other hand, when the load signal $V_{SO}$ is not larger than the detachment-protection threshold $V_{F1}$, it means that the connection port is not polluted, the protection method flow will go back to step 602.

In the case that the positive edge of the voltage signal $V_{DP}$ is detected means that a powered device, such as a smart phone, is attached to the power converter. Referring to FIG. 2A, when the positive edge of the voltage signal $V_{DP}$ occurs at time point $t_1$, the comparator 102 switches its output signal from a low level to a high level (that is, the comparator 102 enables its output signal) and the D flip-flop 201 switches the attachment-confirmation signal $S_{ATC}$ to a high level from a low level in response to the enabled output signal of the comparator 102. Moreover, when the powered device is attached to the power converter, the power converter will firstly start a port-identification procedure, for example, BC1.2 (Battery Charging Specification Revision 1.2) procedure for USB port identification. A period $T_{BC1.2}$ (for instance, 100 ms) of the BC1.2 procedure is predetermined by the BC1.2 counter 105. At time point $t_1$, the BC1.2 counter 105 is enabled by the positive edge (low level to high level) of the output signal of the comparator 102 to perform a time counting for the period $T_{BC1.2}$ of the BC1.2 procedure. At time point $t_2$, the time counting reaches a predetermined counts of the period $T_{BC1.2}$ of the BC1.2 procedure and the BC1.2 counter 105 enables the BC1.2 ready signal $S_{BC}$ at its output, as shown in FIGS. 2A-2C. The period between time points $t_1$ and $t_2$ is the period $T_{BC1.2}$ of the BC1.2 procedure. Further, at time point $t_1$, due to the positive edge of the attachment-confirmation signal $S_{ATC}$, the BC1.2 pollution detection counter 302 enables the BC1.2 delay signal $S_{DC}$ and begins to count an initial period of the BC1.2 procedure. During the initial period of the BC1.2 procedure, the power converter enters an initial protection mode so that the protection circuit 100a will perform a BC1.2 protection. After a predetermined counting period of the BC1.2 pollution detection counter 302 ends, it will disable the BC1.2 delay signal $S_{DC}$ at its output terminal. As shown in FIGS. 2A-2C, the pulse width of the BC1.2 delay signal $S_{DC}$ is the initial period of the BC1.2 procedure. During the initial period of the BC1.2 procedure, the comparator 301 compares the load signal $V_{SO}$ with the initial-protection threshold $V_{F3}$ to determine whether the load signal $V_{SO}$ is larger than the initial-protection threshold $V_{F3}$ (step 604). Once the load signal $V_{SO}$ is larger than the initial-protection threshold $V_{F3}$, it means that the connection port is polluted by a conductive element, the comparator 301 will then enable its output signal. In the meantime, the AND gate 303 will enable the protection signal $P_{BC}$ because its two input terminals are both high level. The OR gate 106 will enable its output signal in response to the enabled protection signal $P_{BC}$. Thus, the D flip-flop 107 will enable the protection-activation signal PRT. This will make the gate driver 31 turn off the power switch 25 to shut down the power converter (step 615). On the contrary, when the load signal $V_{SO}$ is less than the initial-protection threshold $V_{F3}$, it means that the connection port is not polluted during the initial period of the BC1.2 procedure, the protection method flow will go to step 605.

At step 605, the comparator 102 compares the voltage signal $V_{DP}$ with the attachment threshold $V_{TH}$ to determine whether the voltage signal $V_{DP}$ is still larger than the attachment threshold $V_{TH}$. Once the voltage signal $V_{DP}$ becomes less than the attachment threshold $V_{TH}$ (the powered device might be detached), the comparator 102 will disable its output signal. The inverter 202 inverts the disabled output signal of the comparator 102 to an enabled signal which is supplied to an input terminal of the AND gate 203. In this case, the protection method flow will go to step 614 to determine if the powered device has been already detached from the power converter. At step 614, the comparator 205 compares the load signal $V_{SO}$ with the detachment threshold $V_{DTC}$ to determine if the load signal $V_{SO}$ is less than the detachment threshold $V_{DTC}$. Once the load signal $V_{SO}$ is less than the detachment threshold $V_{DTC}$, it means that the powered device is definitely detached from the power converter, the protection method flow will go to step 603. Since the load signal $V_{SO}$ is less than the detachment threshold $V_{DTC}$, the comparator 205 will enable its output signal. The AND gate 204 will enable its output signal according to the enabled (high level) output signal of the comparator 205 and the high level of the attachment-signal $S_{ATC}$. The AND gate 203 will enable its output signal according to the enabled (high level) output signal of the AND gate 204 and the enabled (high level) output signal of the inverter 202. Therefore, the D flip-flop 206 will enable its output signal due to the enabled output signal of the AND gate 203. Thus, the OR gate 208 will enable the detachment-confirmation signal $S_{DTC}$ at its output terminal. At this moment, if the load signal $V_{SO}$ is higher than the detachment-protection threshold $V_{F1}$, the protection signal $P_{DTC}$ will be enabled by the AND gate 403. This will enable the protection-activation signal PRT and shuts down the power converter (step 615). At step 614, on the contrary, whenever the comparator 205 detects that the load signal $V_{SO}$ is not less than the detachment threshold $V_{DTC}$ the protection method flow will continuously loop between steps 605 and step 614 which means the power converter keeps charging the powered device.

Turning back to step 605, when the BC1.2 protection counting ends (step 606), which means the BC1.2 delay signal $S_{DC}$ generated by the BC1.2 pollution detection counter 302 has been disabled, the protection method flow will go to step 607; otherwise, when the BC1.2 protection counting doesn't end, the protection method flow will go back to step 604. At step 607, the BC1.2 procedure has not finished yet. If the comparator 102 detects that the voltage signal $V_{DP}$ becomes less than the attachment threshold $V_{TH}$, the protection method flow will go to step 613. Referring to FIGS. 2B and 2D, when the load signal $V_{SO}$ is less than the detachment threshold $V_{DTC}$, it means that the powered device has been definitely detached from the power converter at time point $t_3$ and the protection method flow will go to step 603. Step 603 determines if the connection port is polluted or not by comparing the load signal $V_{SO}$ and the detachment-protection threshold $V_{F1}$. Going back to step 607, the protection method flow will go to step 609 after the BC1.2 procedure ends (608); otherwise, the protection method flow will go back to step 607 till the BC1.2 procedure ends. At step 608, whether the BC1.2 procedure ends is determined by determining whether the period during which the voltage signal $V_{DP}$ is larger than the attachment threshold $V_{TH}$ exceeds the period $T_{BC1.2}$ of the BC1.2 procedure. When the period during which the voltage signal $V_{DP}$ is larger than the attachment threshold $V_{TH}$ exceeds the period of the port-identification procedure, it means that the BC1.2 procedure ends; otherwise, the BC1.2 procedure does not end yet.

The operation of the detachment-confirmation circuit 200a which performs step 613 when the load signal $V_{SO}$ is less than the detachment threshold $V_{DTC}$ is similar to the above operation of the detachment-confirmation circuit 200a which performs step 614. Thus, the operation description thereof will be omitted here. Whenever the load signal $V_{SO}$ is not less than the detachment threshold $V_{DTC}$ at this moment, the protection method flow will continuously loop between steps 607 and 613 which means the power converter keeps charging the powered device.

At step 609, the powered device is now confirmed to be attached with the power converter after the BC1.2 procedure ends and the power converter will enable a device signal protection mode. In some practical applications, instead of proactively detecting the pollution occurring at the connection port or the connection cable by the power converter itself, the powered device might as well request the power converter to perform pollution detection to detect the presence of the abovementioned pollution. Once the pollution is detected, the power converter will be shut down to protect the powered device accordingly. In one embodiment, the powered device sends out its request by pulling low the voltage signal $V_{DP}$ at the positive signal terminal (D+) after the power converter enables the device signal protection mode. As soon as the BC1.2 procedure ends, the BC1.2 counter 105 will enable the BC1.2 ready signal $S_{BC}$ at its output terminal. As described above, the counting of the period $T_{BC1.2}$ of the BC1.2 procedure is predetermined by the BC1.2 counter 105 and the BC1.2 ready signal $S_{BC}$ is enabled at time point $t_2$ to indicate that the BC1.2 procedure ends. Thus, the D flip-flop 501 will enable the device signal protection mode by outputting a high level signal to an enable terminal EN of the PD signal detection counter 502 in response to the enabled BC1.2 ready signal $S_{BC}$.

During the device signal protection mode, the comparator 102 compares the voltage signal $V_{DP}$ with the attachment threshold $V_{TH}$ to determine whether the voltage signal $V_{DP}$ is less than the attachment threshold $V_{TH}$ (step 610). When the voltage signal $V_{DP}$ is not less than the attachment threshold $V_{TH}$, the protection method will continuously stay at step 610 which means the power converter keeps charging the powered device. On the contrary, when the voltage signal $V_{DP}$ is less than the attachment threshold $V_{TH}$, the protection method flow will go to step 611. As shown in FIGS. 2B and 2C, due to the voltage signal $V_{DP}$ being less than the attachment threshold $V_{TH}$, the comparator 102 switches its output signal from the high level to the low level. At this time, the PD signal detection counter 502 enables the PD ready signal $S_{PS}$ in response to the falling edge of the output signal of the comparator 102 at time point $t_3/t_4$ respectively and begins time counting of a predetermined period of the device signal protection mode. Once the time counting reaches the predetermined period of the PD signal detection counter 502, it will disable the PD ready signal $S_{PS}$ at its output terminal to disable the device signal protection mode.

At step 611, the comparator 503 compares the load signal $V_{SO}$ with the device-protection threshold $V_{F2}$ to determine whether the load signal $V_{SO}$ is larger than the device-protection threshold $V_{F2}$. The device-protection threshold $V_{F2}$ is determined to be a minimum current consumption amount of the powered device while the powered device is requesting the power converter to perform pollution detection. When the load signal $V_{SO}$ is larger than the device-protection threshold $V_{F2}$, it means that while the powered device is being attached to the power converter, the connection port is polluted by a conductive element at time $t_4$. At this moment, when the load signal $V_{SO}$ is larger than the device-protection threshold $V_{F2}$ as shown in FIG. 2C, the comparator 503 enables its output signal. Accordingly, referring to FIGS. 2 and 2C, the AND gate 504 will enable the protection signal $P_{PS}$ at its output terminal according the enabled PD ready signal $S_{PS}$ and the enabled output signal of the comparator 503. Thus, the OR gate 106 will enable its output signal and the D flip-flop 107 will enable the protection-activation signal PRT. Next, the gate driver 31 turns off the power switch 25 to shut down the power converter (step 615). Since the voltage signal $V_{DP}$ becomes less than the attachment threshold $V_{TH}$ at step 610 and the load signal $V_{SO}$ is not larger than the device-protection threshold $V_{F2}$, the powered device might probably be detached from the power converter. The protection method flow will go to step 616 to confirm if the powered device has been definitely detached from the power converter by comparing the load signal $V_{SO}$ with the detachment threshold $V_{DTC}$. Once the load signal $V_{SO}$ is less than the detachment threshold $V_{DTC}$, the PD ready signal $S_{PS}$ will be disabled because the flip-flop 501 is reset by the detachment-confirmation signal $S_{DTC}$ to disable the PD signal detection counter 502. The device signal protection mode will be disable accordingly. The protection method flow will next go to step 603 to determine if the connection port is polluted or not. Otherwise, the protection method flow will go to step 612.

At step 612, it determines whether the device signal protection counting ends by determining whether the PD ready signal $S_{PS}$ is disabled. When the PD ready signal $S_{PS}$ is not disabled yet, it means that the device signal protection doesn't end, the protection method will go back to step 611 again. When the PD ready signal $S_{PS}$ is disabled after the device signal protection counting ends, the device signal protection mode will end accordingly.

According to the above embodiment, the protection circuit 100a can not only detect a protection event, such as pollution, occurring at the connection port or the connection cable, when no powered device is attached to the power converter after the protection circuit 100a is enabled. It can also detect protection events, such as pollution, occurring during the BC1.2 procedure or the device signal protection mode when the powered device is attached to the power converter. Whenever any protection event is detected, the power converter will be shut down to protect the connection port, the USB cable or the powered device from being damaged by a large short-circuited current.

Figure 3:
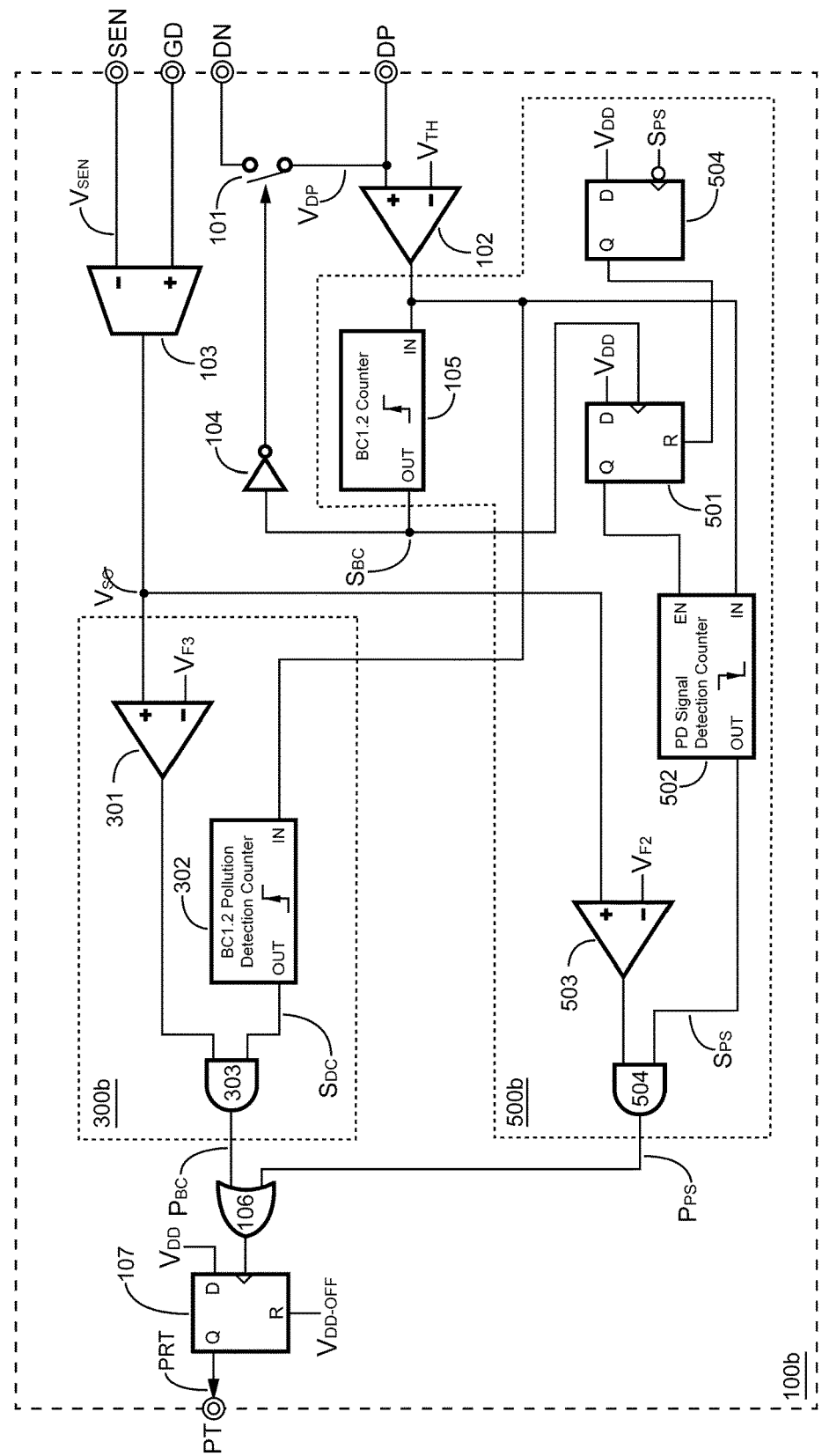
FIG. 3 shows another exemplary embodiment of a protection circuit of the adaptive flyback power converter.

FIG. 3 shows another embodiment of the protection circuit 50. As shown in FIG. 3, the protection circuit 100b is an embodiment of the protection circuit 50. The circuit structure of the protection circuit 100b is similar to that of the protection circuit 100a in FIG. 2. The difference between the protection circuits 100a and 100b is that the protection circuit 100b excludes from the detachment-confirmation circuit 200a and the detachment-protection circuit 400a in FIG. 2. The initial protection circuit 300b and the device-protection circuit 500b in FIG. 3 respectively correspond to the initial protection circuit 300a and the device-protection circuit 500a in FIG. 2. In addition, the device-protection circuit 500b in FIG. 3 further includes a D flip-flop 504, which is not included in the device-protection circuit 500a in FIG. 2, to connect its output terminal (Q) to the reset input of the D flip-flop 501. The input terminal (D) of the D flip-flop 504 receives the supply voltage $V_{DD}$ with a high level and the clock terminal thereof receives an inverted signal of the PD ready signal $S_{PS}$. Referring to FIG. 3, since the protection circuit 100b excludes from the detachment-confirmation circuit 200a and the detachment-protection circuit 400a in FIG. 2, the input terminal of the BC1.2 pollution detection counter 302 is directly coupled to receive the output signal at the output terminal of the comparator 102. When a positive edge occurs at the output signal of the comparator 102, the BC1.2 pollution detection counter 302 will enable the BC1.2 delay signal $S_{DC}$ and begins to count the initial period of the BC1.2 procedure. Moreover, the OR gate 106 only receives two protection signals $P_{BC}$ and $P_{PS}$. When one of the protection signals $P_{BC}$ and $P_{PS}$ is enabled, the protection-activation signal PRT will be enabled to indicate that a corresponding protection event occurs. At this moment, the gate driver 31 turns off the power switch 25 in response to the protection-activation signal PRT to shut down the power converter. In FIGS. 2 and 3, the elements labeled with the same references perform the same operation, the related description will be therefore omitted here.

Figure 3A:
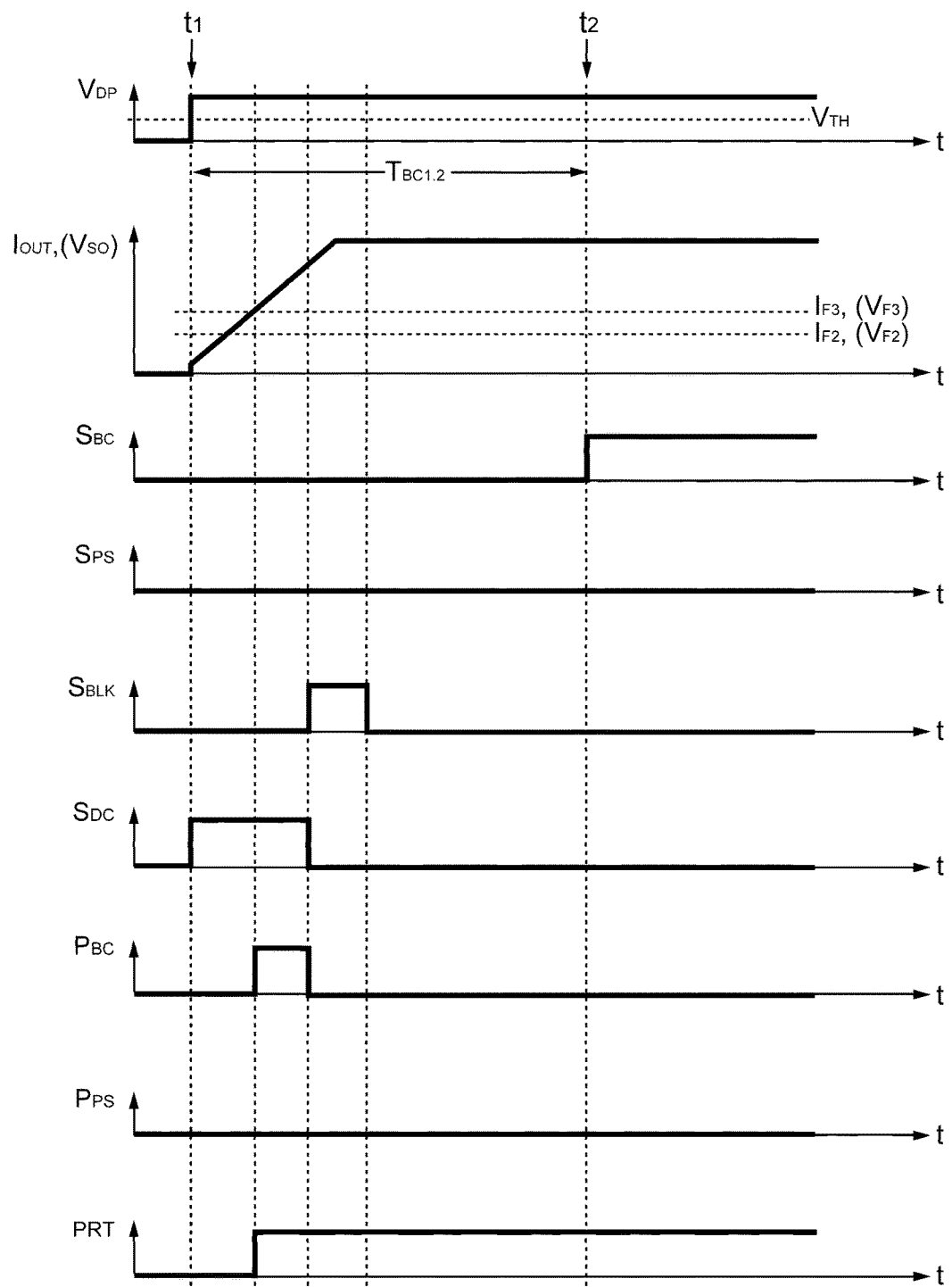
FIG. 3A shows key signal waveforms of the protection circuit in FIG. 3 when the connection port/cable pollution occurs during the initial period of the BC1.2 procedure.

FIG. 3A shows key signal waveforms of the protection circuit in FIG. 3 when the connection port/cable pollution occurs during the initial period of the BC1.2 procedure.

Figure 3B:
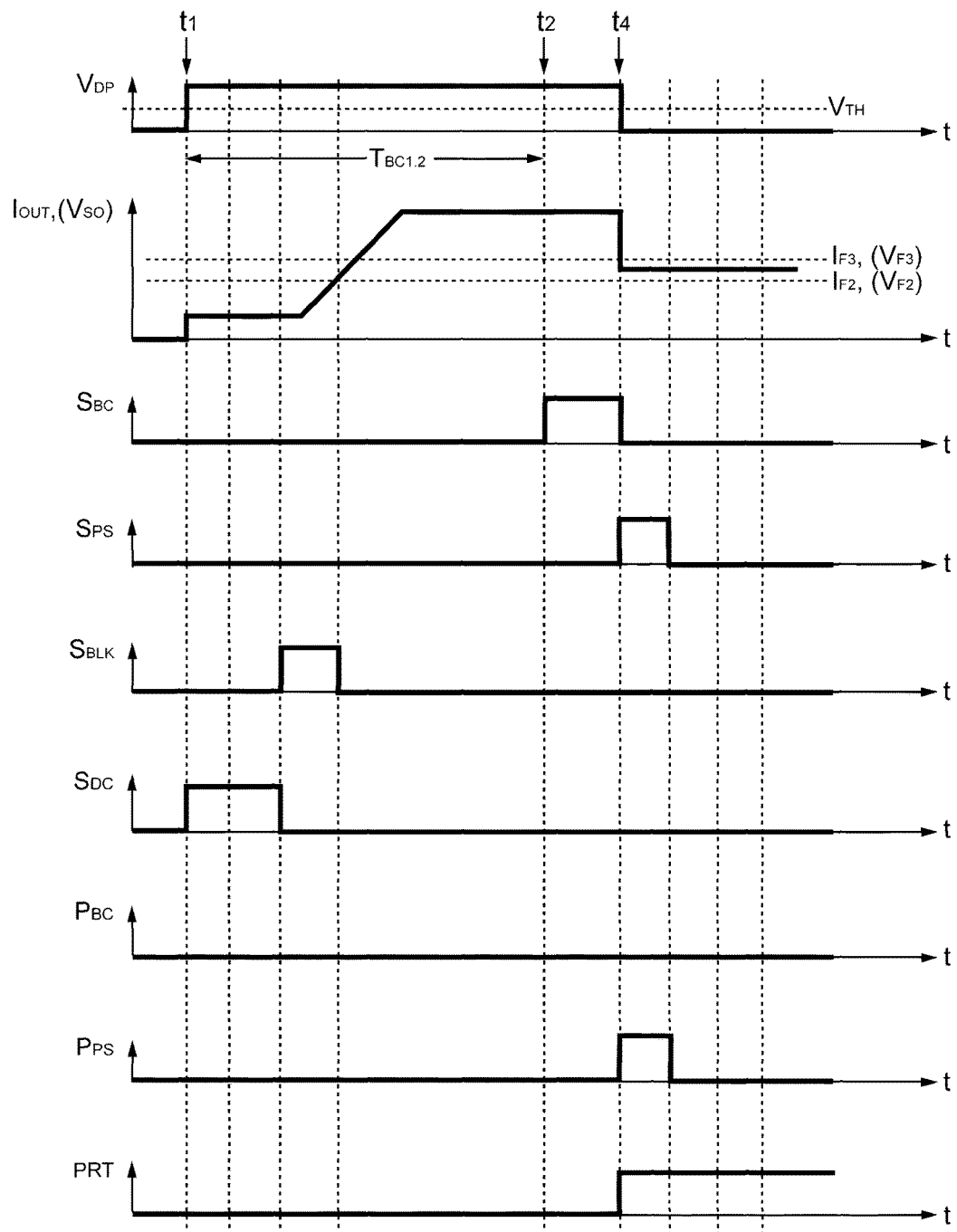
FIG. 3B shows key signal waveforms of the protection circuit in FIG. 3 when the connection port/cable pollution occurs while the powered device is requesting the power converter to perform pollution detection.

FIG. 3B shows key signal waveforms of the protection circuit in FIG. 3 when the connection port/cable pollution occurs while the powered device is requesting the power converter to perform pollution detection.

Figure 3C:
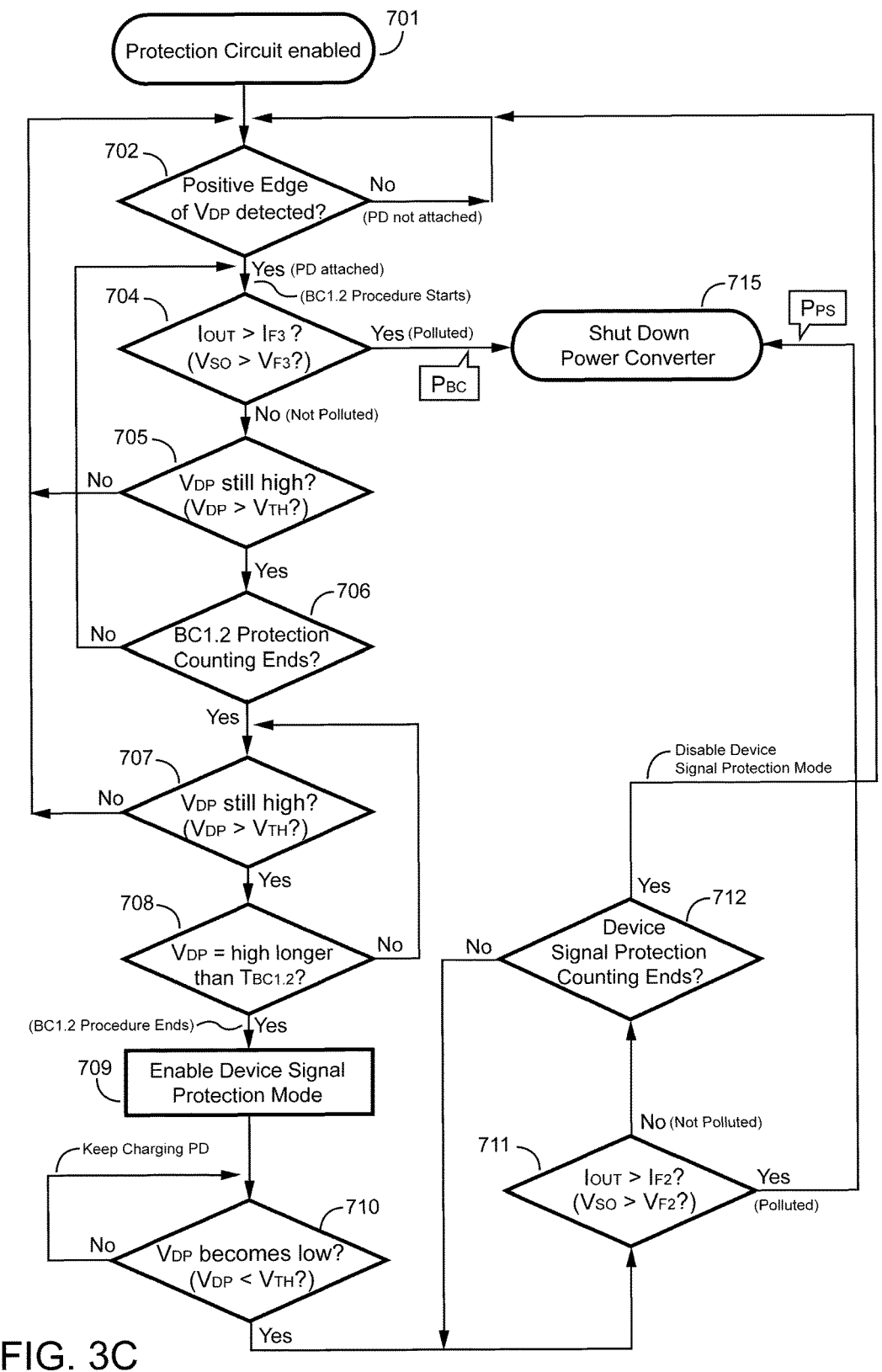
FIG. 3C is a flowchart of an exemplary embodiment of a protection method for the protection circuit in FIG. 3.

FIG. 3C is a flowchart of an exemplary embodiment of a protection method for the protection circuit 100b. Since the protection circuit 100b excludes from the detachment-confirmation circuit 200a and the detachment-protection circuit 400a in FIG. 2, the protection method in FIG. 3C doesn't comprise corresponding steps 603, 613, 614 and 616 in FIG. 2D which are performed by the detachment-confirmation circuit 200a and the detachment-protection circuit 400a. Steps 701, 702, 704, 705, 706, 707, 708, 709, 710, 711, 712 and 715 in FIG. 3C respectively correspond to steps 601, 602, 604, 605, 606, 607, 608, 609, 610, 611, 612 and 615 in FIG. 2D. The related description of these steps and the operations of the elements performing these steps can refer to the embodiment in FIG. 2D. It should be noted that since the protection circuit 100b excludes from the detachment-confirmation circuit 200a and the detachment-protection circuit 400a in FIG. 2, the protection method flow will go back to step 702 when it is determined that a positive edge doesn't occur at the voltage signal $V_{DP}$ (702); when it is determined that the voltage signal $V_{DP}$ is not larger than the attachment threshold $V_{TH}$ (step 705); when it is determined that the voltage signal $V_{DP}$ is not larger than the attachment threshold $V_{TH}$ (step 707); and when the device signal protection counting ends (step 712).

Figure 4:
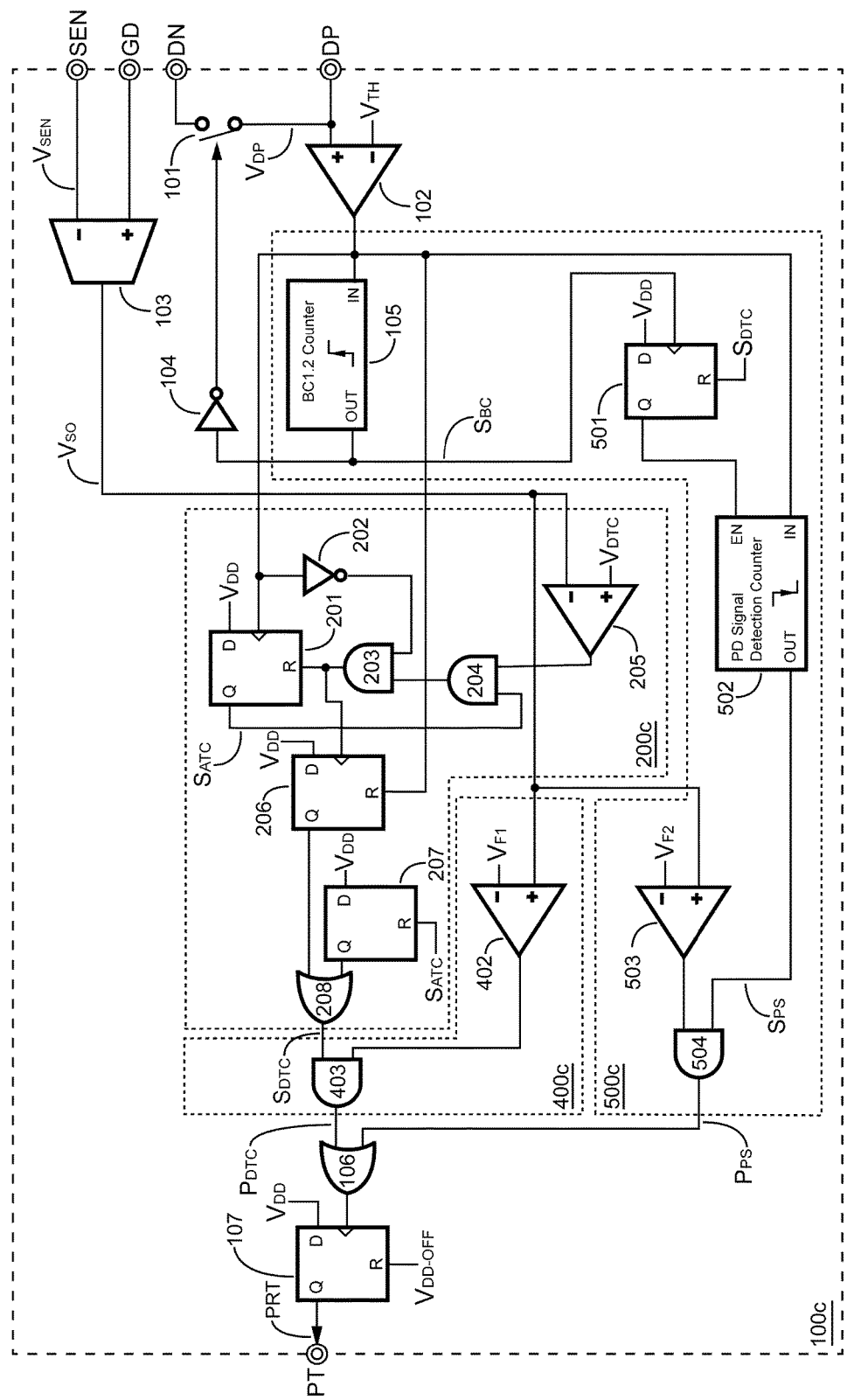
FIG. 4 shows another exemplary embodiment of a protection circuit.

FIG. 4 shows another embodiment of the protection circuit 50. As shown in FIG. 4, the protection circuit 100c is an embodiment of the protection circuit 50. The circuit structure of the protection circuit 100c is similar to that of the protection circuit 100a in FIG. 2. The difference between the protection circuits 100a and 100c is that the protection circuit 100c excludes from the initial protection circuit 300a in FIG. 2. The detachment-confirmation circuit 200c, the detachment-protection circuit 400c, and the device-protection circuit 500c in FIG. 4 respectively correspond to the detachment-confirmation circuit 200a, the detachment-protection circuit 400a and the device-protection circuit 500a in FIG. 2. Referring to FIG. 4, since the protection circuit 100c excludes from the initial protection circuit 300a in FIG. 2, the OR gate 106 only receives two protection signals $P_{DTC}$ and $P_{PS}$. When one of the protection signals $P_{DTC}$ and $P_{PS}$ is enabled, the protection-activation signal PRT will be enabled to indicate that a corresponding protection event occurs. At this moment, the gate driver 31 turns off the power switch 25 in response to the protection-activation signal PRT to shut down the power converter. In FIGS. 2 and 4, the elements labeled with the same references perform the same operation, the related description will be therefore omitted here.

Figure 4A:
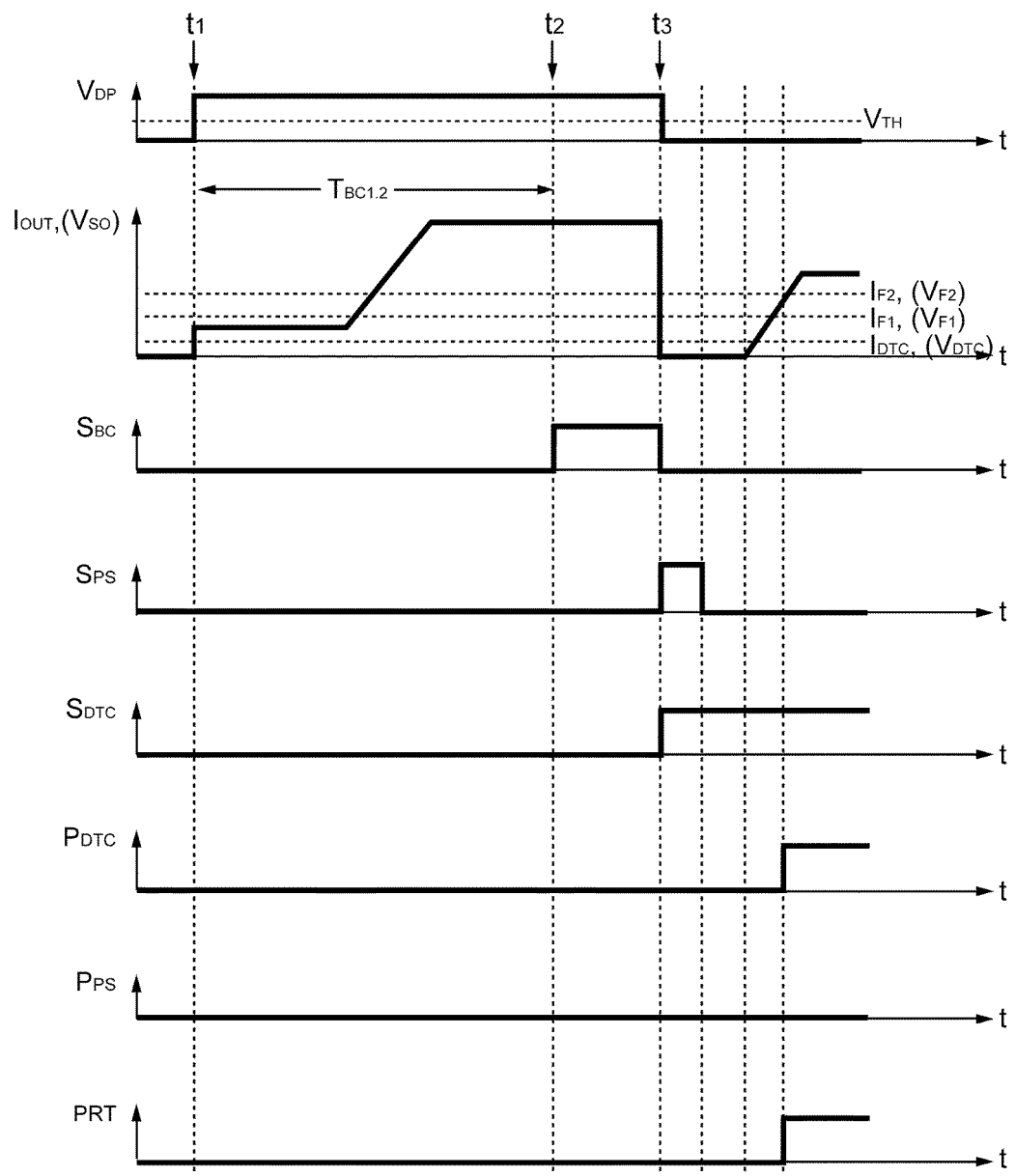
FIG. 4A shows key signal waveforms of the protection circuit in FIG. 4 when the connection port/cable pollution occurs after the powered device is detached from the power converter.

FIG. 4A shows key signal waveforms of the protection circuit in FIG. 4 when the connection port/cable pollution occurs after the powered device is detached from the power converter.

Figure 4B:
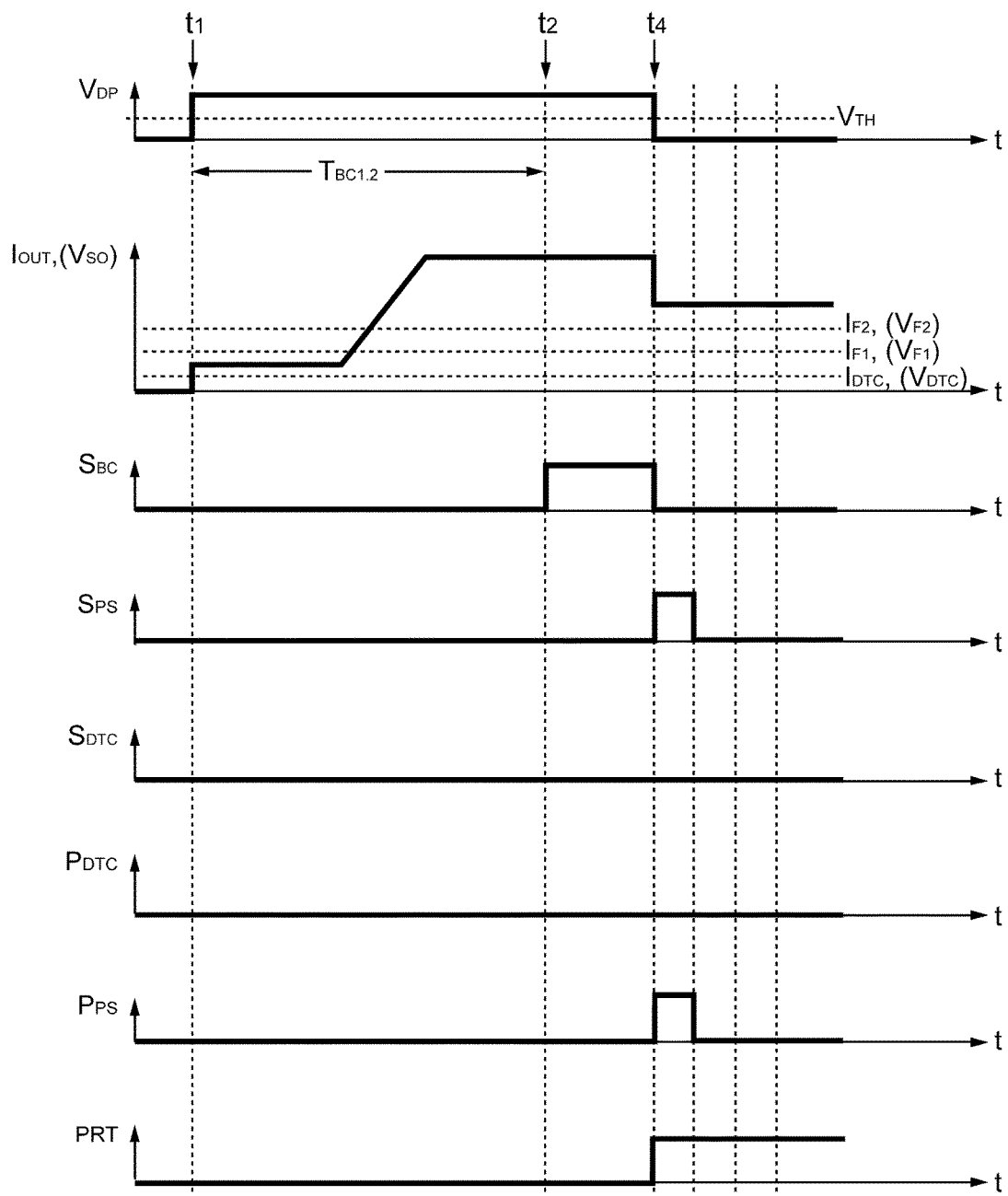
FIG. 4B shows key signal waveforms of the protection circuit in FIG. 4 when the connection port/cable pollution occurs while the powered device is requesting the power converter to perform pollution detection.

FIG. 4B shows key signal waveforms of the protection circuit in FIG. 4 when the connection port/cable pollution occurs while the powered device is requesting the power converter to perform pollution detection.

Figure 4C:
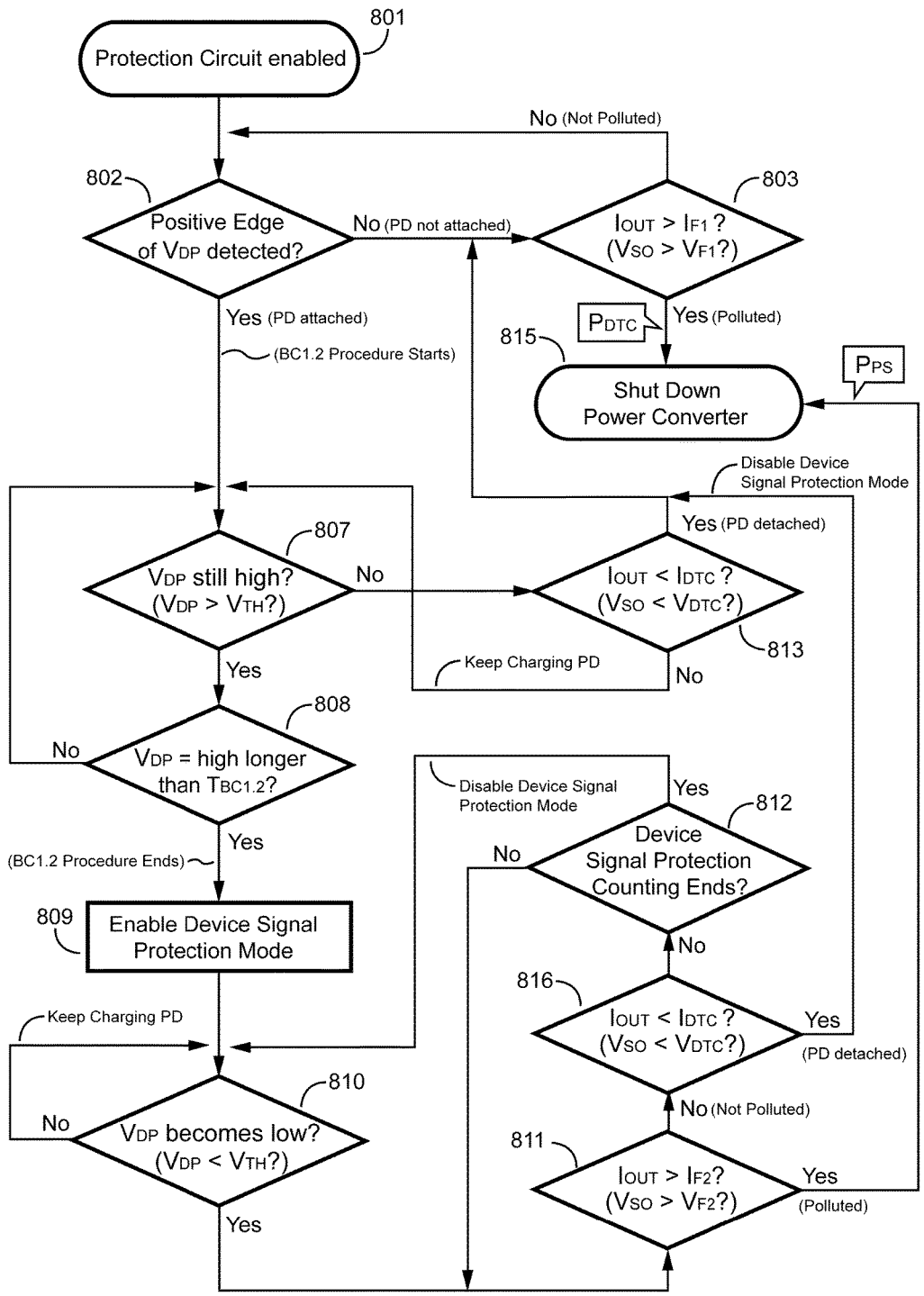
FIG. 4C is a flowchart of an exemplary embodiment of a protection method for the protection circuit in FIG. 4.

FIG. 4C is a flowchart of an exemplary embodiment of a protection method for the protection circuit 100c. Since the protection circuit 100c excludes from the initial protection circuit 300a in FIG. 2, the protection method in FIG. 4C doesn't comprise steps 604, 605, 606 and 614 in FIG. 2D which are performed by the initial protection circuit 300a. Steps 801, 802, 803, 807, 808, 809, 810, 811, 812, 813, 815 and 816 in FIG. 4C respectively correspond to steps 601, 602, 603, 607, 608, 609, 610, 611, 612, 613, 615 and 616 in FIG. 2D. The related description of these steps and the operations of the elements performed for these steps can refer to the embodiment of FIG. 2D. It should be noted that since the protection circuit 100c excludes from the initial protection circuit 300a in FIG. 2, the protection method directly goes to step 807 from step 802 when it is determined that a positive edge occurs at the voltage signal $V_{DP}$ (step 802).

It should also be noted that in the above exemplary embodiments, the initial-protection threshold $V_{F3}$, the device-protection threshold $V_{F2}$ and the detachment-protection threshold $V_{F1}$ are respectively corresponding to current thresholds $I_{F3}$, $I_{F2}$ and $I_{F1}$ of the output current $I_{OUT}$. The levels of the thresholds $V_{F3}$, $V_{F2}$ and $V_{F1}$ are only exemplary which can be determined according to required specifications but all of them should be higher than the detachment threshold $V_{DTC}$.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A protection circuit for a power converter having a connection port coupled to an output of the power converter, comprising:

a sensor circuit, coupled to the connection port, sensing an output current of the power converter to generate a load signal;

a detection circuit, coupled to the connection port, detecting a voltage signal at a signal terminal of the connection port; and an initial protection circuit , coupled to the sensor circuit, receiving the load signal and comparing the load signal with an initial-protection threshold, wherein when the voltage signal at the signal terminal switches to a high level from a low level after the protection circuit is enabled, the power converter enters an initial protection mode and the initial protection circuit counts an initial period of a port-identification procedure;

wherein when the load signal is larger than the initial-protection threshold during the initial period of the port-identification procedure, the initial protection circuit will generate a first protection signal to shut down the power converter, and wherein the high level is a level higher than an attachment threshold and the low level is a level lower than the attachment threshold.

2. The protection circuit of claim 1, wherein the port-identification procedure is a BC1.2 (Battery Charging Specification Revision 1.2) procedure.

3. The protection circuit of claim 1, further comprising:
a detachment-confirmation circuit, coupled to the sensor circuit and the detection circuit, generating a detachment-confirmation signal according to the load signal and the voltage signal at the signal terminal; and
a detachment-protection circuit, coupled to the detachment-confirmation circuit, receiving the detachment-confirmation signal and the load signal and comparing the load signal with a detachment-protection threshold,
wherein when the voltage signal at the signal terminal becomes less than the attachment threshold from the high level and the load signal is less than a detachment threshold, the detachment-confirmation circuit enables the detachment-confirmation signal and
wherein when the detachment-confirmation signal is enabled and the load signal is larger than the detachment-protection threshold, the detachment protection circuit generates a second protection signal to shut down the power converter.

4. The protection circuit of claim 3,
wherein when the voltage signal at the signal terminal is continuously at the low level after the protection circuit is enabled, the detachment-confirmation circuit enables the detachment-confirmation signal,
wherein when the detachment-confirmation signal is enabled and the load signal is larger than the detachment-protection threshold, the detachment protection circuit generates the second protection signal to shut down the power converter.

5. The protection circuit of claim 3 further comprising:
a device-protection circuit, coupled to the sensor circuit and the detection circuit, receiving the load signal and comparing the load signal with a device-protection threshold,
wherein after the power converter leaves the initial protection mode, when the voltage signal at the signal terminal becomes less than the attachment threshold from the high level and the load signal is larger than the device-protection threshold, the device-protection circuit generates a third protection signal to shut down the power converter.

6. The protection circuit of claim 5, wherein the initial-protection threshold, the detachment-protection threshold and the device-protection threshold are all higher than the detachment threshold.

7. The protection circuit of claim 1 further comprising:
a device-protection circuit, coupled to the sensor circuit and the detection circuit, receiving the load signal and comparing the load signal with a device-protection threshold,
wherein after the power converter leaves the initial protection mode, when the voltage signal of the signal terminal becomes less than the attachment threshold from the high level and the load signal is larger than the device-protection threshold, the device-protection circuit generates a second protection signal to shut down the power converter.

8. The protection circuit of claim 1, wherein the connection port is configured to connect with a powered device which is charged by the power converter.

9. The protection circuit of claim 1, wherein the connection port is an USB (Universal Serial Bus) port.

10. A protection circuit for a power converter having a connection port coupled to an output of the power converter, comprising:
a sensor circuit, coupled to the connection port, sensing an output current of the power converter to generate a load signal;
a detection circuit, coupled to the connection port, detecting a voltage signal at a signal terminal of the connection port;
a detachment-confirmation circuit, coupled to the sensor circuit and the detection circuit, generating a detachment-confirmation signal according to the load signal and the voltage signal at the signal terminal; and
a detachment-protection circuit, coupled to the detachment-confirmation circuit, receiving the detachment-confirmation signal and the load signal and comparing the load signal with a detachment-protection threshold,
wherein after the protection circuit is enabled, when the voltage signal at the signal terminal switches to a high level from a low level, the power converter starts a port-identification procedure,
wherein when the voltage signal at the signal terminal becomes less than an attachment threshold and the load signal is less than a detachment threshold, the detachment-confirmation circuit enables the detachment-confirmation signal,
wherein when the detachment-confirmation signal is enabled and the load signal is larger than the detachment-protection threshold, the detachment protection circuit generates a first protection signal to shut down the power converter, and
wherein the high level is a level higher than the attachment threshold and the low level is a level lower than the attachment threshold.

11. The protection circuit of claim 10, wherein the port-identification procedure is a BC1.2 (Battery Charging Specification Revision 1.2) procedure.

12. The protection circuit of claim 10,
wherein when the voltage signal at the signal terminal is continuously at the low level after the protection circuit is enabled, the detachment-confirmation circuit enables the detachment-confirmation signal,
wherein when the detachment-confirmation signal is enabled and the load signal is larger than the detachment-protection threshold, the detachment protection circuit generates the first protection signal to shut down the power converter.

13. The protection circuit of claim 10 further comprising:
a device-protection circuit, coupled to the sensor circuit and the detection circuit, receiving the load signal and comparing the load signal with a device-protection threshold,
wherein after the power converter ends port-identification procedure, when the voltage signal at the signal terminal becomes less than the attachment threshold from the high level and the load signal is larger than the device-protection threshold, the device-protection circuit generates a second protection signal to shut down the power converter.

14. The protection circuit of claim 10, wherein the detachment-protection threshold and the device-protection threshold are both higher than the detachment threshold.

15. The protection circuit of claim 10, wherein the connection port is configured to connect with a powered device which is charged by the power converter.

16. The protection circuit of claim 10, wherein the connection port is an USB (Universal Serial Bus) port.

17. A protection method for a power converter having a connection port coupled to an output of the power converter, comprising:
determining whether a positive edge occurs at a voltage signal at a signal terminal of the connection port;
when the positive edge occurs at the voltage signal at the signal terminal, entering an initial protection mode and determining whether a load signal is larger than an initial-protection threshold during an initial period of a port-identification procedure, wherein the load signal is related to an output current of the power converter; and
when the load signal is larger than the initial-protection threshold during the initial period of the port-identification procedure, shutting down the power converter.

18. The protection method of claim 17, wherein the connection port is an USB (Universal Serial Bus) port.

19. The protection method of claim 17 further comprising:
when the positive edge doesn't occur at the voltage signal at the signal terminal, determining whether the load signal is larger than a detachment-protection threshold; and
when the positive edge doesn't occur at the voltage signal at the signal terminal and the load signal is larger than the detachment-protection threshold, shutting down the power converter.

20. The protection circuit of claim 19, wherein the initial-protection threshold can be higher or lower than the detachment-protection threshold.

21. The protection method of claim 17 further comprising:
during the initial period of the port-identification procedure, when the load signal is not larger than the initial-protection threshold, determining whether the voltage signal at the signal terminal is larger than an attachment threshold;
during the initial period of the port-identification procedure, when the voltage signal at the signal terminal is not larger than the attachment threshold, determining whether the load signal is less than a detachment threshold; and
during the initial period of the port-identification procedure, when the load signal is less than the detachment threshold, determining whether the load signal is larger than a detachment-protection threshold; and
when the load signal is larger than the initial-protection threshold during the initial period of the port-identification procedure, shutting down the power converter.

22. The protection method of claim 21 further comprising:
when the voltage signal at the signal terminal is larger than the attachment threshold, determining whether the initial period of the port-identification procedure ends;
when the initial period of the port-identification procedure ends, determining whether the voltage signal at the signal terminal is larger than the attachment threshold during a remaining period of the port-identification procedure following the initial period thereof;
during the remaining period of the port-identification procedure, when the voltage signal at the signal terminal is not larger than the attachment threshold, determining whether the load signal is less than the detachment threshold;
during the remaining period of the port-identification procedure, when the load signal is less than the detachment threshold, determining whether the load signal is larger than the detachment-protection threshold; and
when the load signal is larger than the detachment-protection threshold during the remaining period of the port-identification procedure, shutting down the power converter.

23. The protection method of claim 22 further comprising:
when the voltage signal at the signal terminal is larger than the attachment threshold during the remaining period of the port-identification procedure, determining whether a period during which the voltage signal at the signal terminal is larger than the attachment threshold exceeds a period of the port-identification procedure;
when the period during which the voltage signal at the signal terminal is larger than the attachment threshold exceeds the period of the port-identification procedure, enabling a device signal protection mode;
during the device signal protection mode, determining whether the voltage signal at the signal terminal is less than the attachment threshold;
during the device signal protection mode, when the voltage signal at the signal terminal is less than the attachment threshold, determining whether the load signal is larger than a device-protection threshold ($V_{F2}$); and
when the load signal is larger than the device-protection threshold during the device signal protection mode, shutting down the power converter.

24. The protection method of claim 23 further comprising:
during the device signal protection mode, when the load signal is not larger than the device-protection threshold during, determining whether the load signal is less than the detachment threshold;
when the load signal is less than the detachment threshold, disabling the device signal protection mode and determining whether the load signal is larger than the detachment-protection threshold;
when the load signal is larger than the detachment-protection threshold, shutting down the power converter.

25. The protection method of claim 24 further comprising:
during the device signal protection mode, when the load signal is not less than the detachment threshold, determining whether the device signal protection mode ends;
when the device signal protection mode ends, determining whether the voltage signal at the signal terminal is less than the attachment threshold; and
when the device signal protection mode doesn't end, determining whether the load signal is larger than the device-protection threshold.

26. The protection method of claim 23, wherein the initial-protection threshold, the detachment-protection threshold and the device-protection threshold are all higher than the detachment threshold.

27. The protection method of claim 17 further comprising:
when the load signal is not larger than the initial-protection threshold, determining whether the voltage signal at the signal terminal is larger than an attachment threshold ($V_{TH}$) during the initial protection mode;
when the voltage signal at the signal terminal is larger than the attachment threshold during a remaining period of the port-identification procedure following the initial period thereof, determining whether a period during which the voltage signal at the signal terminal is larger than the attachment threshold exceeds a period of the port-identification procedure;

when the period during which the voltage signal at the signal terminal is larger than the attachment threshold exceeds the period of the port-identification procedure, enabling a device signal protection mode;

during the device signal protection mode, determining whether the voltage signal at the signal terminal is less than the attachment threshold;

during the device signal protection mode, when the voltage signal at the signal terminal is less than the attachment threshold, determining whether the load signal is larger than a device-protection threshold ($V_{F2}$); and when the load signal is larger than the device-protection threshold during the device signal protection mode, shutting down the power converter.

28. The protection method of claim 27 further comprising:

during the device signal protection mode, when the load signal is not larger than the device-protection threshold, determining whether the device signal protection mode ends;

when the device signal protection mode ends, disabling the device signal protection mode and determining whether the positive edge occurs at the voltage signal at the signal terminal; and when the device signal protection mode doesn't end, determining whether the load signal is larger than the device-protection threshold.

29. The protection method of claim 27, wherein the initial-protection threshold can be higher or lower than the device-protection threshold.

30. The protection method of claim 17 further comprising:
enabling the power converter to charge a powered device through the connection port.

31. A protection method for a power converter having an connection port coupled to an output of the power converter, comprising:

determining whether a positive edge occurs at a voltage signal at a signal terminal of the connection port;

when the positive edge occurs at the voltage signal at the signal terminal, entering a port-identification procedure and determining whether the voltage signal at the signal terminal is larger than an attachment threshold;

during the port-identification procedure, when the voltage signal at the signal terminal is not larger than the attachment threshold, determining whether the load signal is less than a detachment threshold; and during the port-identification procedure, when the load signal is less than the detachment threshold, determining whether a load signal is larger than a detachment-protection threshold, wherein the load signal is related to an output current of the power converter; and when the load signal is larger than the detachment-protection threshold during the port-identification procedure, shutting down the power converter.

32. The protection method of claim 31, wherein the connection port is an USB (Universal Serial Bus) port.

33. The protection method of claim 31 further comprising:
when the positive edge doesn't occur at the voltage signal at the signal terminal, determining whether the load signal is larger than the detachment-protection threshold; and when the positive edge doesn't occur at the voltage signal at the signal terminal and the load signal is larger than the detachment-protection threshold, shutting down the power converter.

34. The protection method of claim 31 further comprising:
when the voltage signal at the signal terminal is larger than the attachment threshold during the port-identification procedure, determining whether a period during which the voltage signal at the signal terminal is larger than the attachment threshold exceeds a period of the port-identification procedure;

when the period during which the voltage signal at the signal terminal is larger than the attachment threshold exceeds the period of the port-identification procedure, enabling a device signal protection mode;

during the device signal protection mode, determining whether the voltage signal at the signal terminal is less than the attachment threshold;

during the device signal protection mode, when the voltage signal at the signal terminal is less than the attachment threshold, determining whether the load signal is larger than a device-protection threshold; and when the load signal is larger than the device-protection threshold during the device signal protection mode, shutting down the power converter.

35. The protection method of claim 34 further comprising:
during the device signal protection mode, when the load signal is not larger than the device-protection threshold during, determining whether the load signal is less than the detachment threshold;

when the load signal is less than the detachment threshold, disabling the device signal protection mode and determining whether the load signal is larger than the detachment-protection threshold;

when the load signal is larger than the detachment-protection threshold, shutting down the power converter.

36. The protection method of claim 31 further comprising:
during the device signal protection mode, when the load signal is not less than the detachment threshold, determining whether the device signal protection mode ends;

when the device signal protection mode ends, determining whether the voltage signal at the signal terminal is less than the attachment threshold; and when the device signal protection mode doesn't end, determining whether the load signal is larger than the device-protection threshold.

37. The protection method of claim 31 further comprising:
enabling the power converter to charge a powered device through the connection port.

* * * * *